(12) United States Patent
Yamabiraki et al.

(10) Patent No.: US 9,319,460 B2
(45) Date of Patent: Apr. 19, 2016

(54) INFORMATION PROCESSING METHOD, COMPUTER-READABLE RECORDING MEDIUM, AND INFORMATION PROCESSING SYSTEM

(71) Applicant: FUJITSU LIMITED, Kawasaki-shi, Kanagawa (JP)

(72) Inventors: Shinji Yamabiraki, Numazu (JP); Takeshi Yamazaki, Fuji (JP); Tamaki Tanaka, Numazu (JP)

(73) Assignee: FUJITSU LIMITED, Kawasaki (JP)

( * ) Notice: Subject to any disclaimer, the term of this patent is extended or adjusted under 35 U.S.C. 154(b) by 184 days.

(21) Appl. No.: 14/282,571

(22) Filed: May 20, 2014

(65) Prior Publication Data

US 2015/0006948 A1 Jan. 1, 2015

(30) Foreign Application Priority Data

Jun. 27, 2013 (JP) ................. 2013-135544

(51) Int. Cl.
| | |
|---|---|
| G06F 11/07 | (2006.01) |
| H04L 29/08 | (2006.01) |
| G06F 11/20 | (2006.01) |
| G06F 11/00 | (2006.01) |

(52) U.S. Cl.
CPC ........ *H04L 67/1034* (2013.01); *G06F 11/2028* (2013.01); *G06F 11/006* (2013.01); *G06F 11/2038* (2013.01)

(58) Field of Classification Search
CPC .......................... G06F 11/2023; G06F 11/2033
USPC .......................................................... 714/13
See application file for complete search history.

(56) References Cited

U.S. PATENT DOCUMENTS

| | | | | |
|---|---|---|---|---|
| 5,822,512 A | * | 10/1998 | Goodrum | G06F 11/142 714/13 |
| 2004/0153888 A1 | | 8/2004 | Kadoi | |
| 2006/0090097 A1 | * | 4/2006 | Ngan | G06F 11/1438 714/6.12 |
| 2007/0180302 A1 | * | 8/2007 | Allen | G06F 11/2097 714/6.3 |
| 2009/0138753 A1 | * | 5/2009 | Tameshige | G06F 11/1662 714/4.1 |
| 2014/0250320 A1 | * | 9/2014 | Nyuunoya | G06F 11/2092 714/4.11 |

FOREIGN PATENT DOCUMENTS

| | | |
|---|---|---|
| JP | 9-218840 | 8/1997 |
| JP | 2000-215177 | 8/2000 |

(Continued)

*Primary Examiner* — Chae Ko
(74) *Attorney, Agent, or Firm* — Staas & Halsey LLP

(57) ABSTRACT

An information processing method includes executing a processing corresponding to a first request of a terminal apparatus using a first information processing apparatus, when a fault occurs in the first information processing apparatus, transmitting an apparatus information that identifies the first information processing apparatus from a second information processing apparatus to the terminal apparatus, after receiving the apparatus information by the terminal apparatus, discarding data transmitted from the first information processing apparatus to the terminal apparatus, transmitting, from the terminal apparatus to the second information processing apparatus, a response notification indicating that the apparatus information is received by the terminal apparatus, and after receiving the response notification by the second information processing apparatus, executing the processing corresponding to a second request of the terminal apparatus using the second information processing apparatus.

16 Claims, 36 Drawing Sheets

(56) References Cited

FOREIGN PATENT DOCUMENTS

| JP | 2004-62535 | 2/2004 |
| JP | 2007-233586 | 9/2007 |
| JP | 2008-28456 | 2/2008 |

* cited by examiner

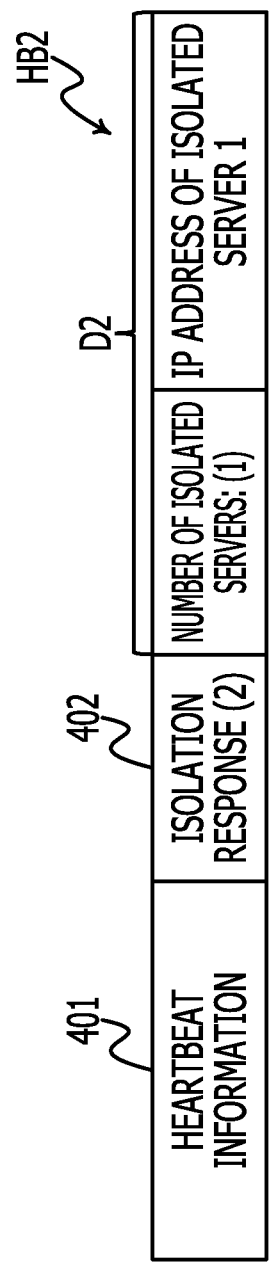
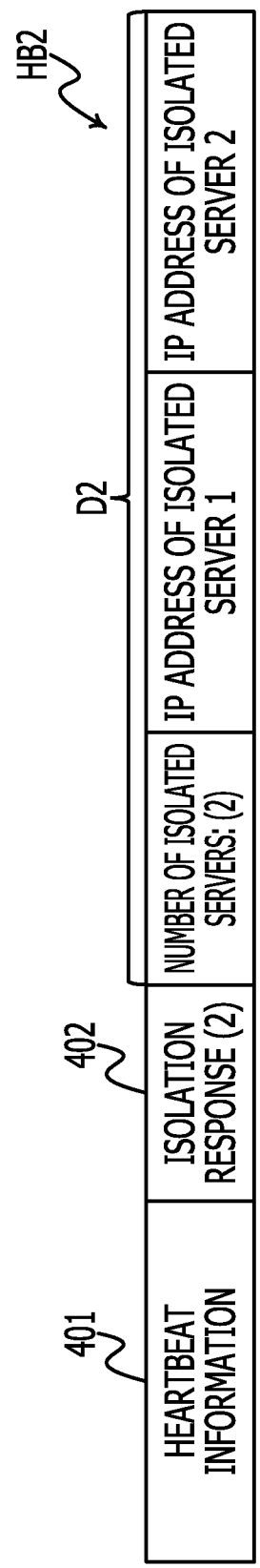

FIG. 9

| | ISOLATION-STATE MANAGEMENT TABLE ~900 | |
|---|---|---|
| | CLIENT ADDRESS | COMPLETION STATE |
| 900-1 | IP_ADDRESS-1 | 0 |
| 900-2 | IP_ADDRESS-2 | 1 |
| 900-3 | IP_ADDRESS-3 | 1 |
| 900-4 | IP_ADDRESS-4 | 0 |

FIG. 30

| No | CONFIGURATION | ISOLATION INFORMATION FOR EACH SERVER | | |
|---|---|---|---|---|
| | | SERVER # 1 | SERVER # 2 | SERVER # 3 |
| 1 | 3-NODE CONFIGURATION | [0 SERVER] ISOLATION NOT RECOGNIZED | [0 SERVER] ISOLATION NOT RECOGNIZED | [0 SERVER] ISOLATION NOT RECOGNIZED |
| 2 | | [0 SERVER] ISOLATION NOT RECOGNIZED★ | [1 SERVER] SERVER #1 IS ISOLATED | [1 SERVER] SERVER #1 IS ISOLATED |
| 3 | | [1 SERVER] SERVER #1 IS ISOLATED★ | [1 SERVER] SERVER #1 IS ISOLATED | [1 SERVER] SERVER #1 IS ISOLATED |
| 4 | | [0 SERVER] ISOLATION NOT RECOGNIZED★ | [2 SERVERS] SERVERS #1 AND #2 ARE ISOLATED | [2 SERVERS] SERVERS #1 AND #2 ARE ISOLATED★ |
| 5 | | [0 SERVER] ISOLATION NOT RECOGNIZED★ | [1 SERVER] SERVER #1 IS ISOLATED★ | [2 SERVERS] SERVERS #1 AND #2 ARE ISOLATED★ |
| 6 | | [1 SERVER] SERVER #1 IS ISOLATED★ | [2 SERVERS] SERVERS #1 AND #2 ARE ISOLATED | [2 SERVERS] SERVERS #1 AND #2 ARE ISOLATED★ |
| 7 | | [1 SERVER] SERVER #1 IS ISOLATED★ | [1 SERVER] SERVER #1 IS ISOLATED★ | [2 SERVERS] SERVERS #1 AND #2 ARE ISOLATED★ |
| 8 | | [2 SERVERS] SERVERS #1 AND #2 ARE ISOLATED★ | [1 SERVER] SERVER #1 IS ISOLATED★ | [2 SERVERS] SERVERS #1 AND #2 ARE ISOLATED★ |
| 9 | | [2 SERVERS] SERVERS #1 AND #2 ARE ISOLATED★ | [2 SERVERS] SERVERS #1 AND #2 ARE ISOLATED★ | [2 SERVERS] SERVERS #1 AND #2 ARE ISOLATED★ |
| 10 | 2-NODE CONFIGURATION | [0 SERVER] ISOLATION NOT RECOGNIZED | [0 SERVER] ISOLATION NOT RECOGNIZED | |
| 11 | | [0 SERVER] ISOLATION NOT RECOGNIZED★ | [1 SERVER] SERVER #1 IS ISOLATED | |
| 12 | | [1 SERVER] SERVER #1 IS ISOLATED | [1 SERVER] SERVER #1 IS ISOLATED | |

FIG. 32A

3101 — HEARTBEAT INFORMATION | NUMBER OF ISOLATION-TARGET SERVERS: (1) | D | IP ADDRESS OF ISOLATION-TARGET SERVER 1 ← HB

FIG. 32B

3101 — HEARTBEAT INFORMATION | NUMBER OF ISOLATION-TARGET SERVERS: (2) | D | IP ADDRESS OF ISOLATION-TARGET SERVER 1 | IP ADDRESS OF ISOLATION-TARGET SERVER 2 ← HB

INFORMATION PROCESSING METHOD, COMPUTER-READABLE RECORDING MEDIUM, AND INFORMATION PROCESSING SYSTEM

CROSS-REFERENCE TO RELATED APPLICATION

This application is based upon and claims the benefit of priority of the prior Japanese Patent Application No. 2013-135544, filed on Jun. 27, 2013, the entire contents of which are incorporated herein by reference.

FIELD

The embodiments discussed herein are related to an information processing method, a computer-readable recording medium, and an information processing system.

BACKGROUND

Mission-critical systems are information processing systems that involve high reliability, failure tolerance, and availability, and typically continue to operate 24 hours a day, 365 days a year. The mission-critical system, for example, has cluster system architecture, and failover is executed when a fault occurs in a server or the like. The term "failover" refers to a function by which a standby server takes over processes and data instead of a working server, for example, when a fault occurs in the working server.

In cluster systems, in order to achieve data integrity and task-service continuity, it is important that only one working server perform processing in any situation, and there are demands for a scheme for ensuring that two or more servers do not operate as working servers. Two or more servers operating as working servers may hereinafter be referred to as a "double active operation".

Heretofore, a cluster system using power-supply control devices has been available as a technology for inhibiting the double active operation. The power-supply control devices are apparatuses having a dedicated function for starting up and shutting down servers. In the cluster system using the power-supply control devices, during switching of the working server, a switching-target server uses the power-supply control device to stop the power supply of a switching-source server. Upon detecting the stopping of the power supply of the switching-source server, the switching-target server is switched to a working server to thereby execute failover, while inhibiting the double active operation. The switching-target server is a server that operates as a working server after execution of failover. The switching-source server is a server that has been operating as a working server before execution of failover.

An example of a related technology is a technology in which a failed node notifies a service processor about the occurrence of a failure or transmits failure information to another node in the same partition to thereby perform processing for the failure. There is also a technology in which, when a server that is operating as a standby system detects a fault in a server that is operating as a working server, a request for blocking communication to/from communication equipment connected to the faulty server is issued to thereby disconnect the faulty server from a network. Examples of related technologies are disclosed in Japanese Laid-open Patent Publication No. 2004-62535 and Japanese Laid-open Patent Publication No. 2007-233586.

SUMMARY

According to an aspect of the invention, an information processing method includes executing a processing corresponding to a first request of a terminal apparatus using a first information processing apparatus, when a fault occurs in the first information processing apparatus, transmitting an apparatus information that identifies the first information processing apparatus from a second information processing apparatus to the terminal apparatus, after receiving the apparatus information by the terminal apparatus, discarding data transmitted from the first information processing apparatus to the terminal apparatus, transmitting, from the terminal apparatus to the second information processing apparatus, a response notification indicating that the apparatus information is received by the terminal apparatus, and after receiving the response notification by the second information processing apparatus, executing the processing corresponding to a second request of the terminal apparatus using the second information processing apparatus.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 6A and 6B illustrate specific examples of the heartbeat;

FIG. 9 illustrates an example of the contents of an isolation-state management table;

FIG. 30 is a table illustrating combinations of the numbers of isolation-target servers and isolation-target servers;

FIGS. 32A and 32B illustrate specific examples of the heartbeat;

DESCRIPTION OF EMBODIMENTS

According to the related technologies, when a fault occurs in the working server, it is difficult to inhibit two or more servers operating as working servers in the cluster system, and thus there are cases in which switching from the working server to the standby server fails.

For example, when a fault occurs in the power-supply control device in the working server in which a fault occurs (that is, in a faulty server) or in a network leading to the power-supply control device, there are cases in which the stopping of the power supply of the faulty server fails and thus the disconnection of the faulty server from the system fails. More specifically, for example, even when an instruction for disconnecting the faulty server from the system is issued from the normal server to the faulty server, there are cases in which the instruction does not reach the faulty server or the faulty server that has received the instruction is not operable properly, and consequently, the disconnection of the faulty server from the system fails.

Also, when a fault occurs in a faulty server or a network leading to a faulty server, there are cases in which the faulty server itself fails to perform fault detection, fault notification, and so on, and thus the disconnection of the faulty server from the system fails. When a fault occurs in network equipment connected to a faulty server or in a network leading to network equipment, there are cases in which the faulty server itself fails to perform fault detection, fault notification, and so on, and thus the disconnection of the faulty server from the system fails. More specifically, for example, even when an instruction for disconnecting from the system is transmitted from the normal server to the faulty server, there are cases in which the instruction does not reach the faulty server or the faulty server that has received the instruction is not operable properly, and thus the disconnection of the faulty server from the system fails.

In such cases, the power-supply control device in each server in the cluster system and the network leading to the power-supply control device may be made redundant to make it possible to disconnect a faulty server from the system even when a fault occurs in the power-supply control device or the network leading to the power-supply control device. However, when the power-supply control device or the network leading to the power-supply control device is switched to a redundant standby system, it takes time to perform processing for the switching, thus causing a problem in that it difficult to perform failover quickly.

According to embodiments described below, it is possible to perform switching from a working apparatus to a standby apparatus, even in a state in which it is significantly difficult to stop the operation of the working apparatus in which a fault has occurred.

First Embodiment

Figure 1:
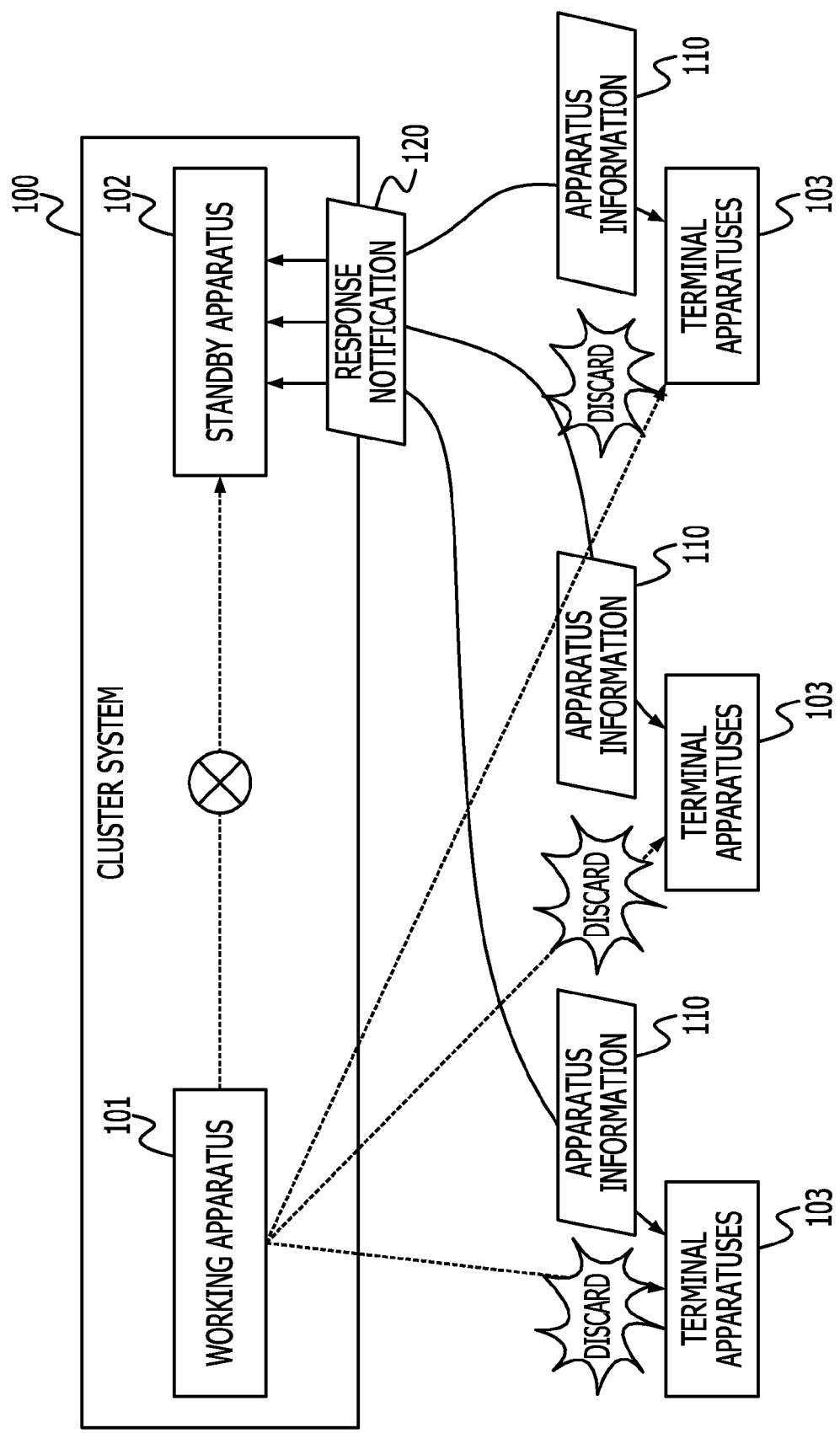
FIG. 1 is a diagram illustrating one example of a control method according to a first embodiment.

FIG. 1 is a diagram illustrating one example of a control method according to a first embodiment. As illustrated in FIG. 1, a cluster system 100 includes a working apparatus 101 and a standby apparatus 102. The working apparatus 101 is a working computer that executes processing corresponding to processing requests from terminal apparatuses 103. The standby apparatus 102 is a standby computer for the working apparatus 101 and stands by in order to execute, instead of the working apparatus 101, processing corresponding to processing requests from the terminal apparatuses 103.

The terminal apparatuses 103 are computers for issuing processing requests to the cluster system 100. Although a case in which the number of standby computers is one will hereinafter be described by way of example, the cluster system 100 may have a configuration including two or more standby computers. Although a case in which the number of terminal apparatuses 103 is three will hereinafter be described by way of example, any number of one or more terminal apparatuses 103 may be connected to the cluster system 100.

The information processing system that involves high reliability, failure tolerance, and availability, has cluster system architecture, and failover is performed when a fault occurs in a server or the like. The term "failover" refers to a function by which, when a fault occurs in a working computer (for example, a server), a standby computer takes over processes and data instead of the working computer.

In the following description, a server that has been operating as a working server before execution of failover may be referred to as a "switching-source server", and a server that operates as a working server after execution of failover may be referred to as a "switching-target server".

As a solution for ensuring that, when a fault occurs in a server in a cluster system, the faulty server does not affect a normal server, there is a packet filtering technique for blocking communication with the faulty server. When the packet filtering technique is applied to a cluster system, for example, a client apparatus blocks communication with a switching-source server (a faulty server) during execution of failover, thereby making it possible to ensure that the faulty server does not affect any normal server.

However, when a virtual Internet Protocol (IP) address is used for access from the client apparatus to the server, it is significantly difficult for the client apparatus to discriminate between a switching-source server and a switching-target server based on a destination address. The "virtual IP address" is a virtual IP address assigned to a group of servers and used for access from client apparatuses to the servers. In a cluster system including a plurality of servers, a scheme in which a client apparatus accesses a group of servers by using the virtual IP address and only a working server in the group of servers accepts the processes is employed in order to confine the range of influence during execution of failover. An example of the virtual IP address is a multicast address.

That is, since all of the servers appear to have the same IP address to the client apparatus, packet filtering using a destination IP address is not performed during transmission of a request electronic message. Hence, the client apparatus can block communication only during reception of a response electronic message from the server. Thus, there are cases in which a faulty server receives a request electronic message from the client apparatus.

Consequently, when the faulty server has not completely stopped its operation and is in a semi-death state or is malfunctioning, it is difficult to suppress the influence that the faulty server has on the normal server. When the faulty server continues to transmit unwanted electronic messages, this affects responses from servers that are operating properly, for example, causing an increase in a load on the network.

Accordingly, in the first embodiment, when a fault occurs in the working apparatus 101, the standby apparatus 102 transmits, to the terminal apparatuses 103, an isolation request for isolating the working apparatus 101 to thereby isolate the working apparatus 101, and performs switching to the standby server 102 in response to isolation responses from the terminal apparatuses 103. This arrangement inhibits the double active operation and realizes failover, even when the working apparatus 101 is in a semi-death state or is malfunctioning. The description below is given of an example of control processing performed by the cluster system 100 according to the first embodiment.

(1) The standby apparatus 102 detects a fault in the working apparatus 101. More specifically, for example, the standby apparatus 102 may detect a fault in the working apparatus 101, when a communication from the working apparatus 101 is interrupted.

(2) Upon detecting a fault in the working apparatus 101, the standby apparatus 102 transmits apparatus information 110 for identifying the working apparatus 101 to the terminal apparatuses 103. The apparatus information 110 is, for example, information for issuing an instruction for blocking communication with the working apparatus 101 in which a fault was detected. The apparatus information 110 includes, for example, identification information for uniquely identifying the working apparatus 101. The examples of the identification information include the IP address assigned to the working apparatus 101.

(3) Upon receiving the apparatus information 110, each terminal apparatus 103 changes its operation state to a state for discarding data from the working apparatus 101 and also transmits a response notification 120 to the standby apparatus 102. The response notification 120 is a notification indicating that the apparatus information 110 is received, and is, for example, a notification indicating that the corresponding terminal apparatus 103 has changed its operation state to the state for discarding data from the working apparatus 101.

More specifically, for example, each terminal apparatus 103 sets the IP address of the working apparatus 101, the IP address being included in the apparatus information 110, as the transmission-source address of data to be discarded. After the setting, for example, upon receiving data whose transmission-source address is the IP address set as the transmission-source address of data to be discarded, the terminal apparatus 103 discards the received data.

(4) Upon receiving the response notifications 120 from the terminal apparatuses 103, the standby apparatus 102 changes its operation state to a state for executing, instead of the working apparatus 101, processing corresponding to processing requests from the terminal apparatuses 103. That is, the standby apparatus 102 becomes a new working computer instead of the working apparatus 101 in which a fault was detected, to execute processing corresponding to processing requests from the terminal apparatuses 103.

Thus, according to the cluster system 100, it is possible to disconnect the working apparatus 101 and it is possible to realize failover, even when the working apparatus 101 in which a fault has occurred is in a semi-death state and does not operate properly. In addition, since this scheme is not based on the premise that the power supply of the working apparatus 101 is turned off, it is possible to disconnect the working apparatus 101, for example, even under a situation in which a power-supply control device in the working apparatus 101 does not operate properly.

Even when a virtual IP address is used for access from the terminal apparatus 103 to the working apparatus 101, the terminal apparatus 103 can block communication with the working apparatus 101. In addition, even in an environment where the working apparatus 101 does not have a power-supply control device, it is possible to disconnect the working apparatus 101.

Next, a description will be given of an example of the system configuration of an information processing system 200 according to the first embodiment.

Figure 2:
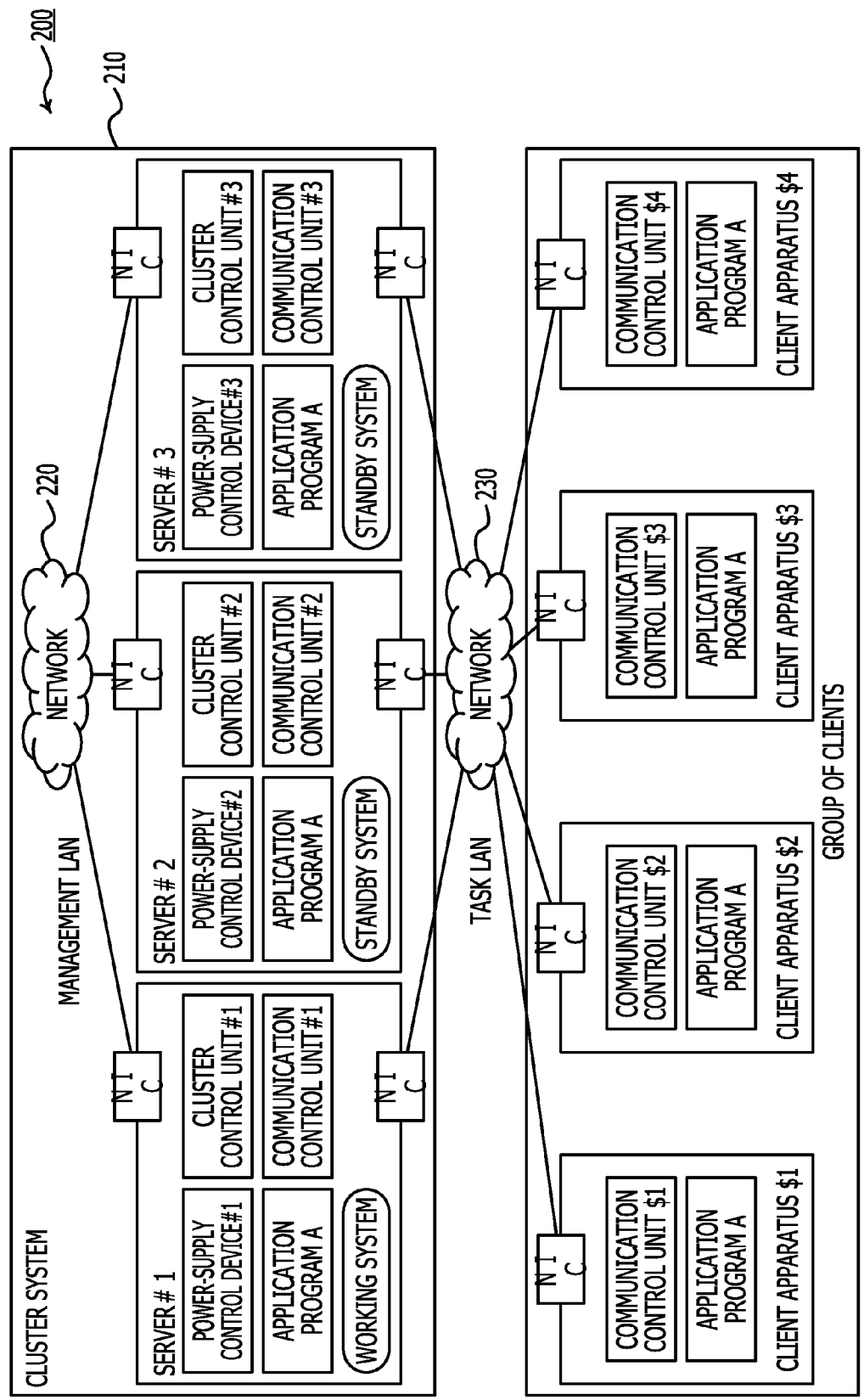
FIG. 2 is a diagram illustrating an example of the system configuration of an information processing system.

FIG. 2 is a diagram illustrating an example of the system configuration of the information processing system 200. As illustrated in FIG. 2, the information processing system 200 includes servers #1 to #3 and client apparatuses $1 to $4. In the information processing system 200, the servers #1 to #3 are connected to each other through a network 220. The servers #1 to #3 and the client apparatuses $1 to $4 are also connected to each other through a network 230.

Examples of the networks 220 and 230 include a local area network (LAN), a wide area network (WAN), and the Internet. More specifically, the network 220 is a management LAN for controlling a cluster system 210 and provides connections between the servers #1 to #3 in order to perform failover, server dead or alive monitoring, or the like.

The network 230 is a task LAN for external communication and provides connections between the servers and the client apparatuses and between the servers to perform communication of processing requests and processing results. The servers connected through the network 230 may include servers in a different cluster system. That is, although only the cluster system 210 is illustrated in FIG. 2 as a cluster system included in the information processing system 200, a cluster system that is different from the cluster system 210 may also be included therein.

The servers #1 to #3 constitute a group of servers included in the cluster system 210. The server #1 is a working server for executing processing corresponding to processing requests from the client apparatuses $1 to $4 and corresponds to the working apparatus 101 illustrated in FIG. 1. The servers #2 and #3 are standby servers that stand by in order to execute, instead of the working server #1, processing corresponding to processing requests from the client apparatuses $1 to $4 and correspond to the standby apparatus 102 illustrated in FIG. 1.

The servers #1 to #3 have power-supply control devices #1 to #3, cluster control units #1 to #3, communication control units #1 to #3, and application programs A, respectively. The power-supply control devices #1 to #3 are computers that control startup/shutdown of the respective servers #1 to #3. For example, the power-supply control devices #1 to #3 shut down the working server when failover is executed to switch between the working server and the standby server.

The cluster control units #1 to #3 have functions for controlling the cluster system 210. For example, the cluster control units #1 to #3 use the management LAN to perform issuance of instructions for failover, server dead or alive monitoring, and so on. The communication control units #1 to #3 have functions for controlling communication between the servers #1 to #3 and the client apparatuses $1 to $4 and communication between the servers #1 to #3. For example, the communication control units #1 to #3 use the task LAN 230 to control communication that occurs in task processing from the application program A. The application program A is a program for realizing task services. The application program A may be provided in, for example, the servers #1 to #3 and the client apparatuses $1 to $4.

The client apparatuses $1 to $4 have communication control units $1 to $4 and the application programs A. The communication control units $1 to $4 have functions for controlling communication between the servers #1 to #3 and the client apparatuses $1 to $4. For example, the communication control units $1 to $4 use the task LAN 230 to control communication that occurs in task processing from the application program A.

In the information processing system 200, the client apparatuses $1 to $4 transmit processing requests by using the virtual IP addresses assigned to the servers #1 to #3. Thus, the processing requests from the client apparatuses $1 to $4 are transmitted to the servers #1 to #3. The servers #1 to #3 then decide whether or not the respective local servers #1 to #3 are working servers. When the local servers #1 to #3 are working servers, the servers #1 to #3 execute processes corresponding to the processing requests from the client apparatuses $1 to $4.

The servers #1 to #3 may be, for example, virtual machines. The term "virtual machines" refers to virtual computers that operate in an execution environment constructed by dividing the hardware resources of physical machines. The actual elements of each virtual machine include, for example, software such as programs and an operating system (OS), variables given to the software, and information for specifying hardware resources for executing the software.

In the following description, an arbitrary server of the servers #1 to #3 may be referred to as a "server #i" (i=1, 2, or 3). Also, an arbitrary client apparatus of the client apparatuses $1 to $4 may be referred to as a "client apparatus $j" (j=1, 2, 3, or 4).

(Hardware Configuration of Computer)

Next, a description will be given of an example of the hardware configurations of the server #i and the client apparatus $j (hereinafter referred to simply as "computers") illustrated in FIG. 2.

Figure 3:
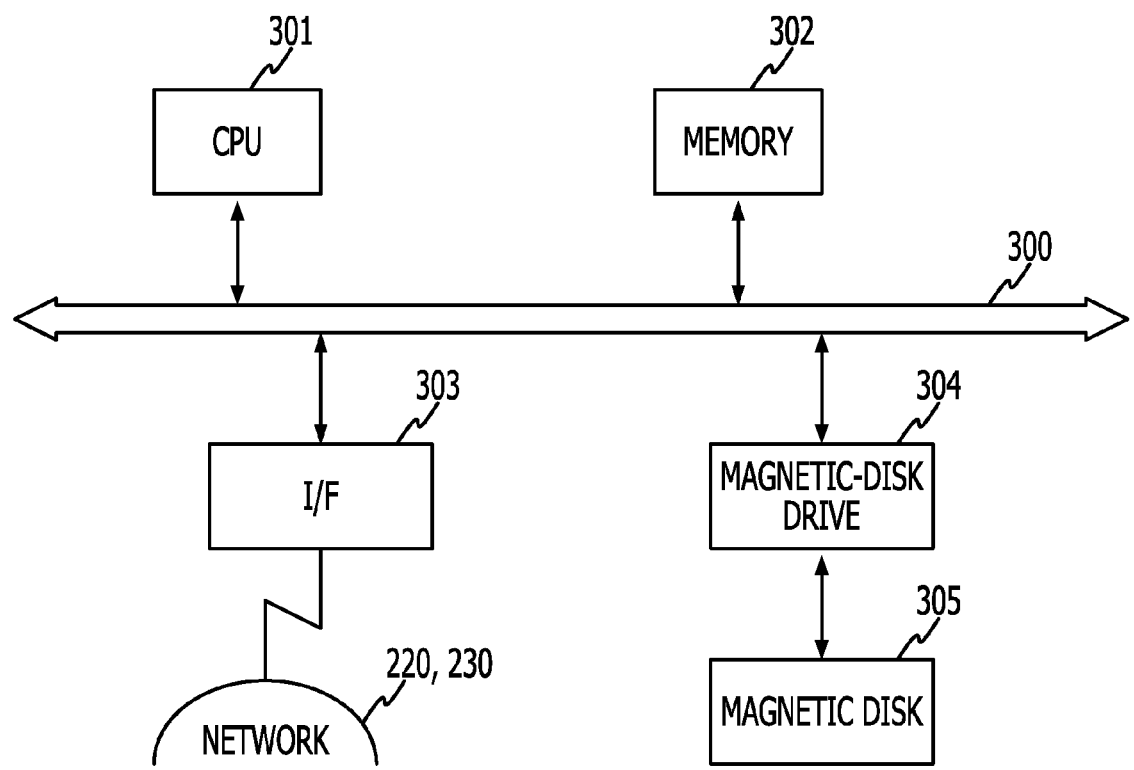
FIG. 3 is a block diagram illustrating an example of the hardware configuration of each computer.

FIG. 3 is a block diagram illustrating an example of the hardware configuration of each computer. As illustrated in FIG. 3, the computer includes a central processing unit (CPU) 301, a memory 302, an interface (I/F) 303, a magnetic-disk drive 304, and a magnetic disk 305. These elements are coupled to each other through a bus 300.

The CPU 301 is responsible for controlling the entire computer. The memory 302 includes, for example, a read-only memory (ROM), a random access memory (RAM), and a flash ROM. More specifically, for example, the flash ROM and the ROM store therein various programs, and the RAM is used as a work area for the CPU 301. The programs stored in the memory 302 are loaded to the CPU 301, to thereby cause the CPU 301 to execute coded processes.

The I/F 303 is connected to the networks 220 and 230 through communication channels and is connected with other computers through the networks 220 and 230. The I/F 303 is responsible for interfacing between the inside of the computer and the networks 220 and 230 and controls input/output of data to/from other computers. The I/F 303 may be implemented by, for example, a network interface card (NIC).

The magnetic-disk drive 304 controls writing/reading of data to/from the magnetic disk 305 in accordance with control performed by the CPU 301. The magnetic disk 305 stores thereon data written under the control of the magnetic-disk drive 304.

In addition to the constituent elements described above, the computer may also have, for example, a solid-state drive (SSD), a keyboard, a mouse, and a display. The power-supply control devices #1 to #3 illustrated in FIG. 2 may also be implemented by a hardware configuration that is the same as or similar to the above-described example configuration of the computer.

Next, a description will be given of an electronic-message format of heartbeats HB according to the first embodiment. The heartbeats HB are signals that a computer or network equipment sends to notify external apparatuses and so on on a network that it is operating properly. The heartbeats HB are transmitted/received, for example, between servers and client apparatuses and between servers in different cluster systems through use of the task LAN. The transmission interval of the heartbeats HB is, for example, about 1 to 5 seconds.

In the following description, blocking communication with a faulty server in which a fault has occurred so as to ensure that the faulty server does not affect a normal server may be referred to as "isolation". A server to be isolated or a server that is isolated may be referred to as an "isolation-target server", and a server to be de-isolated or a server that is de-isolated may be referred to as a "de-isolation-target server".

Figure 4:
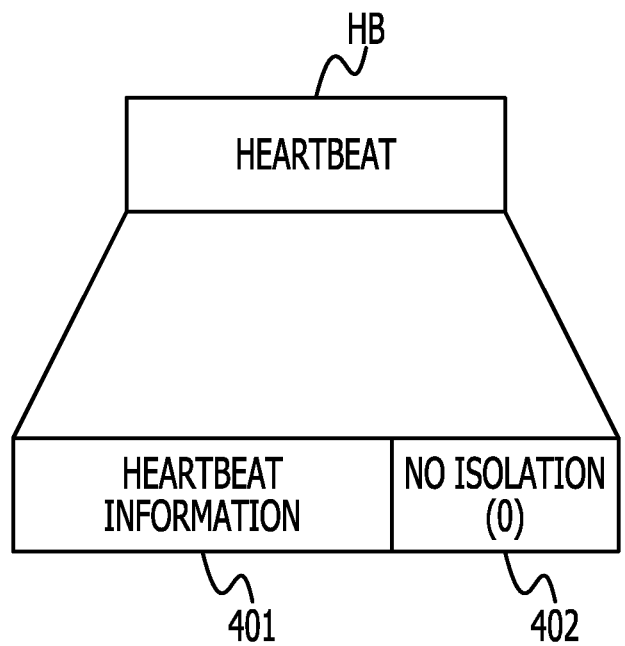
FIG. 4 illustrates an example of the electronic-message format of each heartbeat.

FIG. 4 illustrates an example of the electronic-message format of each heartbeat HB. As illustrated in FIG. 4, the heartbeat HB includes heartbeat information 401 and isolation-instruction-type information 402. The heartbeat information 401 is information indicating that the computer (the server #i or the client apparatus $j) that transmits the heartbeat HB is operating properly and includes, for example, a node number and an IP address for identifying the computer.

The isolation-instruction-type information 402 is information indicating whether or not isolation information D is appended to the heartbeat HB. The isolation information D is information for identifying an isolation-target server or a de-isolation-target server. A specific example of the isolation information D is described later with reference to FIGS. 5A to 8. One of isolation instruction types "0" to "4" is set in the isolation-instruction-type information 402.

In this case, the isolation instruction type "0" indicates that no isolation information D is appended to the heartbeat HB. The isolation instruction type "1" indicates that the isolation information D is appended to the heartbeat HB and also indicates an isolation request for isolating an isolation-target server. The isolation instruction type "2" indicates that the isolation information D is appended to the heartbeat HB and also indicates an isolation response to an isolation request.

The isolation instruction type "3" indicates that the isolation information D is appended to the heartbeat HB and also indicates a de-isolation request for de-isolating a de-isolation-target server. The isolation instruction type "4" indicates that the isolation information D is appended to the heartbeat HB and also indicates a de-isolation response to the de-isolation request.

Now, a specific example of the heartbeat HB will be described with reference to FIGS. 5A to 8.

Figure 5A:
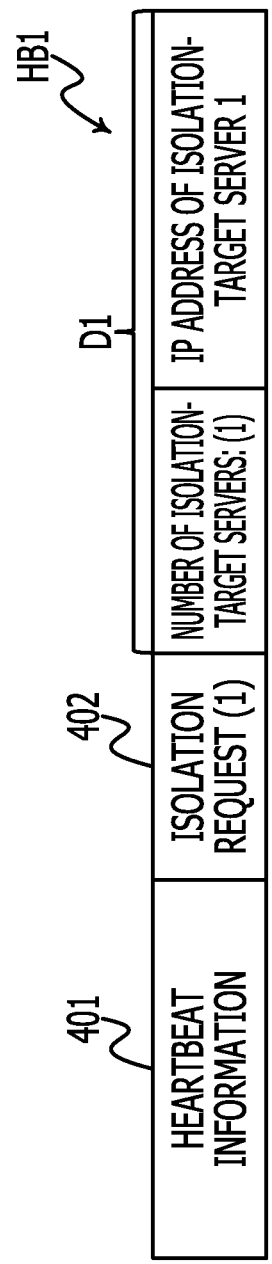
FIGS. 5A and 5B illustrate specific examples of the heartbeat.
Figure 5B:
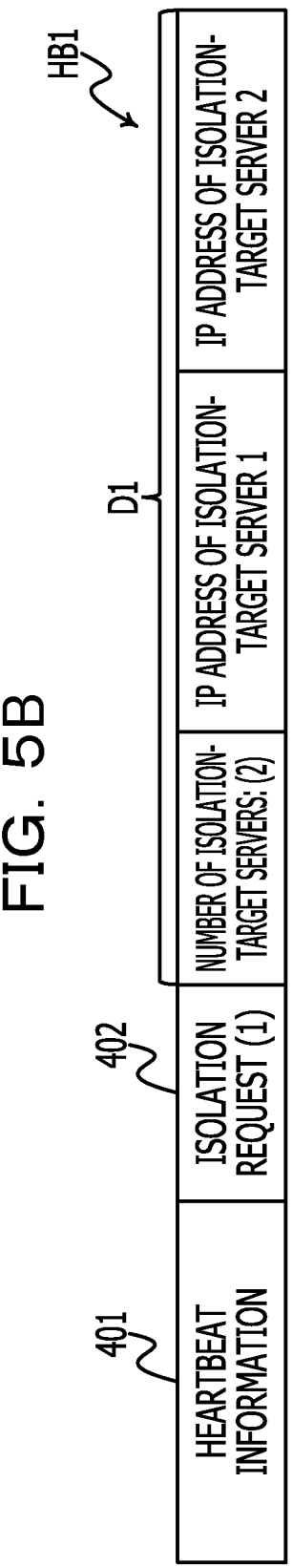

FIGS. 5A and 5B illustrate specific examples of the heartbeat HB. In FIGS. 5A and 5B, a heartbeat HB1 is a signal for reporting that the server #i is operating properly, and includes the heartbeat information 401, the isolation-instruction-type information 402, and isolation information D1. The isolation instruction type "1" indicating an isolation request for isolating an isolation-target server is set in the isolation-instruction-type information 402. The isolation information D1 includes the number of isolation-target servers and the IP address(es) of the isolation-target server(s).

More specifically, the heartbeat HB1 illustrated in FIG. 5A is an example when the number of isolation-target servers is "1". In this case, the number of isolation-target servers, "1", and the IP address of an isolation-target server 1 are set in the isolation information D1. The heartbeat HB1 illustrated in FIG. 5B is an example when the number of isolation-target servers is "2". In this case, the number of isolation-target servers, "2", and the IP addresses of isolation-target servers 1 and 2 are set in the isolation information D1.

FIGS. 6A and 6B illustrate specific examples of the heartbeat HB. In FIGS. 6A and 6B, a heartbeat HB2 is a signal for reporting that the client apparatus $j is operating properly, and includes the heartbeat information 401, the isolation-instruction-type information 402, and isolation information D2. The isolation instruction type "2" indicating an isolation response to an isolation request is set in the isolation-instruction-type information 402. The isolation information D2 includes the number of servers isolated by the client apparatus $j and the IP address(es) of the isolated server(s).

The heartbeat HB2 illustrated in FIG. 6A is an example when the number of isolated servers is "1". In this case, the number of isolated servers, "1", and the IP address of an isolated server 1 are set in the isolation information D2. The heartbeat HB2 illustrated in FIG. 6B is an example when the number of isolated servers is "2". In this case, the number of isolated servers, "2", and the IP addresses of isolated servers 1 and 2 are set in the isolation information D2.

Figure 7:
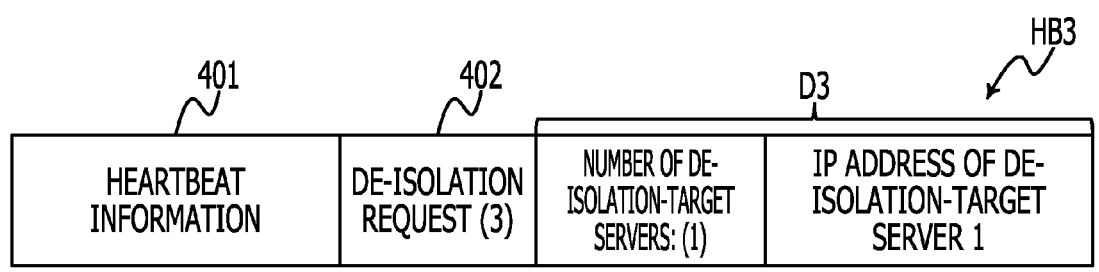
FIG. 7 illustrates a specific example of the heartbeat.

FIG. 7 illustrates a specific example of the heartbeat HB. As illustrated in FIG. 7, a heartbeat HB3 is a signal for reporting that the server #i is operating properly, and includes the heartbeat information 401, the isolation-instruction-type information 402, and isolation information D3. The isolation instruction type "3" indicating a de-isolation request for de-isolating a de-isolation-target server is set in the isolation-instruction-type information 402. The isolation information D3 includes the number of de-isolation-target servers and the IP address(es) of the de-isolation-target server(s).

More specifically, the heartbeat HB3 is an example when the number of de-isolation-target servers is "1". In this case, the number of de-isolation-target servers, "1", and the IP address of a de-isolation-target server 1 are set in the isolation information D3.

Figure 8:
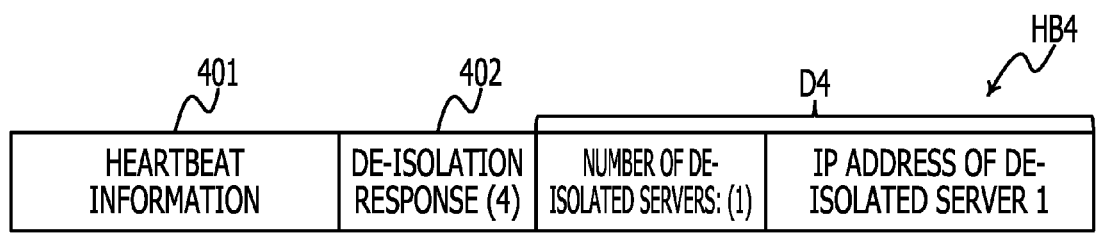
FIG. 8 illustrates a specific example of the heartbeat.

FIG. 8 illustrates a specific example of the heartbeat HB. As illustrated in FIG. 8, a heartbeat HB4 is a signal for reporting that the client apparatus $j is operating properly, and includes the heartbeat information 401, the isolation-instruction-type information 402, and isolation information D4. The isolation instruction type "4" indicating a de-isolation response to a de-isolation request is set in the isolation-instruction-type information 402. The isolation information D4 includes the number of servers de-isolated by the client apparatus $j and the IP address(es) of the de-isolated server(s).

More specifically, the heartbeat HB4 is an example when the number of de-isolated servers is "1". In this case, the number of de-isolated servers, "1", and the IP address of a de-isolated server 1 are set in the isolation information D4.

Next, a description will be given of the contents of an isolation-state management table 900 used by the server #i. The isolation-state management table 900 is realized by, for example, the memory 302 (illustrated in FIG. 3) in the server #i.

FIG. 9 illustrates an example of the contents of the isolation-state management table 900. The isolation-state management table 900 illustrated in FIG. 9 has a "client address" field and a "completion state" field. When information is set in the fields, pieces of isolation-state management information 900-1 to 900-4 are stored as records.

In the isolation-state management table 900, the client addresses are the IP addresses of the client apparatuses $j that are connected to the server #i. The completion state indicates a state in which the client apparatus $j has completed processing for isolating isolation-target servers and processing for de-isolating de-isolation-target servers. A completion state "0" indicates that the isolation/de-isolation processing is not completed. A completion state "1" indicates that the isolation/de-isolation processing is completed or is omissible.

For example, isolation-state management information 900-1 indicates that the completion state of the client apparatus $j having an IP address "IP_ADDRESS-1" is "0", which indicates that the isolation processing/de-isolation processing in the client apparatus $j is not completed.

In the following description, it is assumed that the IP address of the client apparatus $1 is "IP_ADDRESS-1" and the IP address of the client apparatus $2 is "IP_ADDRESS-2". It is further assumed that the IP address of the client apparatus $3 is "IP_ADDRESS-3" and the IP address of the client apparatus $4 is "IP_ADDRESS-4".

Next, a description will be given of the contents of an isolation-target server list 1000 used by the server #i and the client apparatus $j. The isolation-target server list 1000 is realized by, for example, the memories 302 (illustrated in FIG. 3) in the server #i and the client apparatus $j.

Figure 10:
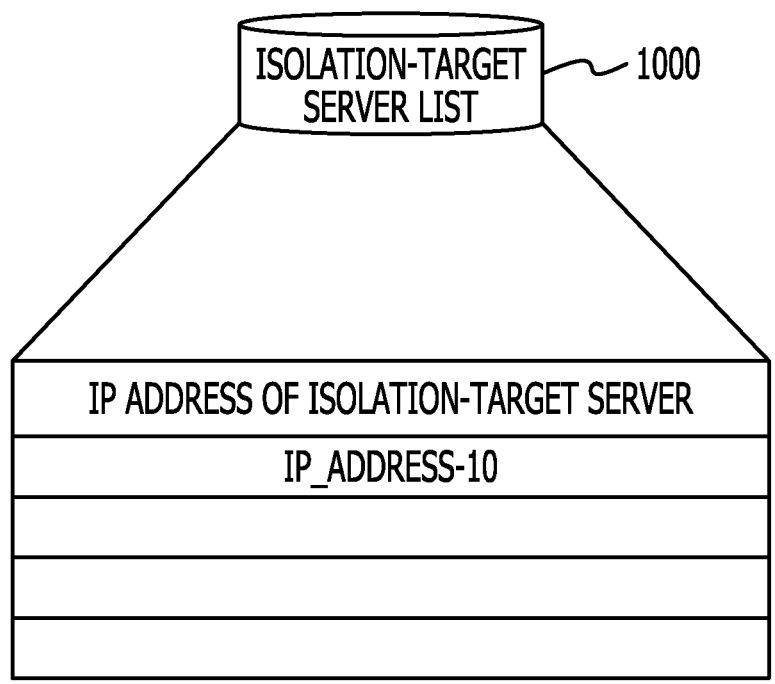
FIG. 10 illustrates an example of the contents of an isolation-target server list.

FIG. 10 is a diagram illustrating an example of the contents of the isolation-target server list 1000. The isolation-target server list 1000 illustrated in FIG. 10 has the IP address of an isolation-target server. In this case, the IP address "IP_ADDRESS-10" is set as the IP address of the isolation-target server.

For example, the isolation-target server list 1000 in the client apparatus $j is created when the client apparatus $j is started up and is deleted when the client apparatus $j is shut down.

Figure 11:
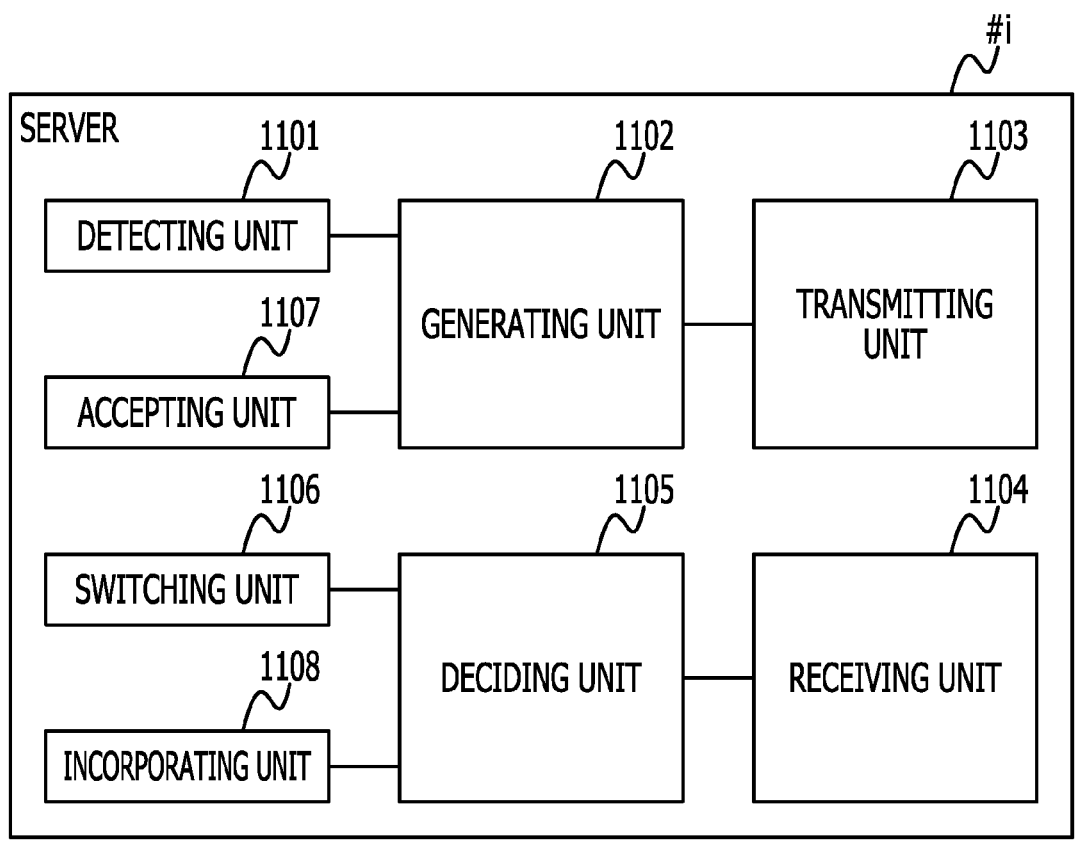
FIG. 11 is a block diagram illustrating an example of the functional configuration of a server.

FIG. 11 is a block diagram illustrating an example of the functional configuration of the server #i. As illustrated in FIG. 11, the server #i includes a detecting unit 1101, a generating unit 1102, a transmitting unit 1103, a receiving unit 1104, a deciding unit 1105, a switching unit 1106, an accepting unit 1107, and an incorporating unit 1108. Specifically, the functions of the functional units are realized via the I/F 303 or by the CPU 301 executing a program stored in a storage device, such as the memory 302 or the magnetic disk 305 (illustrated in FIG. 3) in the server #i. Processing results of the functional units are stored in, for example, a storage device, such as the memory 302 or the magnetic disk 305.

The detecting unit 1101 has a function for detecting a fault in a working server #k (k≠i and k=1, 2, . . . ). In the example in FIG. 2, the working server #k is the server #1 (k=1). For example, the detecting unit 1101 may detect a fault in the working server #k, specifically, by detecting an interruption in communication performed with the working server #k through the management LAN.

In order to perform maintenance, inspection, and so on of the working server #k, there are also cases in which an administrator or the like of the information processing system 200 intentionally stops the operation of the working server #k. In such cases, for example, the detecting unit 1101 may detect a fault in the working server #k in response to an operation input from an external computer (not illustrated) used by the administrator.

The result of the detection is stored in, for example, the isolation-target server list 1000 illustrated in FIG. 10. More specifically, the IP address of the working server #k in which a fault has been detected is registered in the isolation-target server list 1000 as the IP address of an isolation-target server. The arrangement, however, may also be such that, when the processing for isolating the working server #k in which a fault was detected is completed, the IP address of the working server #k is registered in the isolation-target server list 1000.

Upon detecting a fault in the working server #k, the server #i may share the fault in the working server #k with, among the servers #1 to #3 included in the cluster system 210, the servers except for the working server #k in which the fault was detected, by synchronizing information with the servers.

The generating unit 1102 has a function for generating isolation information D1 including the number of isolation-target servers and the IP address(es) of the isolation-target server(s). More specifically, for example, when the detecting unit 1101 detects a fault in the working server #k, the generating unit 1102 generates isolation information D1 in which the IP address of the working server #k is set as the IP address of an isolation-target server.

In this case, there are cases in which the IP address of an isolation-target server other than the working server #k has been registered in the isolation-target server list 1000. In this case, the generating unit 1102 generates isolation information D1 in which the IP address registered in the isolation-target server list 1000 is further set as the IP address of an isolation-target server.

The transmitting unit 1103 has a function for transmitting the isolation information D1 generated by the generating unit 1102 to the client apparatus $j. More specifically, for example, by using the task LAN, the transmitting unit 1103 transmits, to all of the client apparatuses $1 to $4 that are connected, the heartbeat HB1 (for example, see FIGS. 5A and 5B) in which the isolation instruction type "1" is set and to which the isolation information D1 is appended.

The transmitting unit 1103 also has a function for transmitting, when the detecting unit 1101 detects a fault in the working server #k, a power-supply stop instruction to the power-supply control device #k for controlling the power supply of the working server #k. The power-supply stop instruction is an instruction that is given for stopping the power supply of the working server #k. More specifically, for example, the transmitting unit 1103 uses the management LAN to transmit a power-supply stop instruction to the power-supply control device #k in the working server #k.

The receiving unit 1104 has a function for receiving, from the client apparatus $j, the isolation information D2 including the number of servers isolated by the client apparatus $j and the IP address(es) of the isolated server(s). More specifically, for example, by using the task LAN, the receiving unit 1104 receives, from the client apparatus $j, the heartbeat HB2 (for example, see FIGS. 6A and 6B) in which the isolation instruction type "2" is set and to which the isolation information D2 is appended.

When the IP address of the local server #i is included in the isolation information D2 (in the heartbeat HB2) received from the client apparatus $j, the server #i may disconnect communication with all of the client apparatuses $1 to $4 that are connected. Such an arrangement allows the server #i to isolate itself where a fault has occurred.

The receiving unit 1104 also has a function for receiving a power-supply stop response from the power-supply control device #k in the working server #k. The power-supply stop response indicates that the power supply of the working server #k has been stopped in response to the power-supply stop instruction from the server #i. More specifically, for example, the receiving unit 1104 uses the management LAN to receive the power-supply stop response from the power-supply control device #k in the working server #k.

The deciding unit 1105 has a function for deciding whether or not the client apparatus $j has completed the isolation-target server isolation processing. More specifically, for example, when the heartbeat HB2 is received from the client apparatus $j, the deciding unit 1105 decides that the client apparatus $j has completed the isolation-target server isolation processing.

The result of the decision is stored in, for example, the isolation-state management table 900 illustrated in FIG. 9. Now, assume a case in which the heartbeat HB2 is received from the client apparatus $1. In this case, the deciding unit 1105 identifies, in the isolation-state management table 900, the isolation-state management information 900-1 in which the IP address "IP_ADDRESS-1" of the client apparatus $1 is set in the "client address" field. The deciding unit 1105 then sets "1" in the "completion-state" field in the identified isolation-state management information 900-1. This makes it possible to determine the client apparatus $j that has completed the isolation-target server isolation processing.

The deciding unit 1105 also has a function for deciding that, if no isolation information D2 is received from the client apparatus $j even when a certain amount of time T has passed after the isolation information D1 is transmitted to the client apparatus $j, the isolation-target server isolation processing in the client apparatus $j is omissible. The certain amount of time T may be a timeout time T_out for heartbeat communication using the task LAN. More specifically, for example, the timeout time T_out is a time of about 5 to 10 seconds.

If no heartbeat HB is received from the client apparatus $j even when the timeout time T_out passes, there is a possibility that some type of fault has occurred in the client apparatus $j. Accordingly, for example, if no heartbeat HB2 is received from the client apparatus $j even when the timeout time T_out has passed after the heartbeat HB1 is transmitted to the client apparatus $j, the deciding unit 1105 decides that the isolation processing in the client apparatus $j is omissible.

The switching unit 1106 has a function for changing its operation state to a state for executing, instead of the working server #k, processing corresponding to processing requests from the client apparatus $j. Changing the operation state to the state for executing processing corresponding to processing requests from the client apparatus $j means that the local server becomes a working server.

More specifically, for example, when a power-supply stop response is received from the power-supply control device #k or when the isolation-target server isolation processing is completed, the switching unit 1106 may switch the working server from the server #k to the local server. The case in which the isolation-target server isolation processing is completed is a case in which it is decided that the isolation-target server isolation processing in all of the client apparatuses $1 to $4 that are connected with the server #i is "completed" or is "omissible".

For example, it is assumed that the working server #k in which a fault was detected is a "server #1" and the server #i is a "server #2". In this case, the server #2 communicates with, among the servers #1 to #3, the server #3 other than the server #1 in which a fault was detected, to thereby determine a server that newly becomes a working server. When the determined working server is the local server, the server #2 switches the working server to the local server.

The server #i may also notify the client apparatuses $1 to $4 that the working server has been switched to the local server #i. As a result, even if the client apparatuses $1 to $4 do not use virtual IP addresses to access the working server, the client apparatuses $1 to $4 can also recognize the working server after the switching.

The receiving unit 1104 has a function for receiving a communication-channel establish request from the client apparatus $j. The communication-channel establish request is, for example, a request for establishing a session in which heartbeats HB are transmitted/received between the server and the client apparatus by using the task LAN. More specifically, for example, the receiving unit 1104 receives a session establish request from the client apparatus from which no heartbeat HB2 is received or from any of the client apparatuses $j newly connected to the cluster system 210. The client apparatus from which no heartbeat HB2 is received is, for example, the client apparatus $j that has started operating properly again from a semi-death state, such as a hang.

The transmitting unit 1103 also has a function for transmitting the isolation information D1 to the client apparatus $j upon receiving a communication-channel establish request from the client apparatus $j. More specifically, for example, by using a session established through the task LAN in response to a session establish request, the transmitting unit 1103 transmits the heartbeat HB1 to the client apparatus $j that is the request source. As a result, an isolation-target server isolation instruction can be issued to the client apparatus $j that has started operating properly again from a semi-death state, such as a hang, and a newly connected client apparatus.

The accepting unit 1107 has a function for accepting a designation of an incorporation-target server. The incorporation-target server is a server to be incorporated into the cluster system 210. For example, the incorporation-target server is a server that has started operating properly again from a semi-death state, such as a hang, or a server to be newly incorporated into the cluster system 210.

More specifically, for example, the accepting unit 1107 accepts an incorporation-target server incorporate instruction, upon a user's operation input using a keyboard and a mouse (not illustrated) or upon an operation input from an external computer (not illustrated). The accepting unit 1107 may also accept an incorporation-target server incorporate instruction from the incorporation-target server.

The generating unit 1102 also has a function for generating, when the incorporation-target server is an isolation-target server, isolation information D3 including the number of de-isolation-target servers and the IP address of the de-isolation-target server. More specifically, for example, the generating unit 1102 generates isolation information D3 in which the IP address of the incorporation-target server is set as the IP address of the de-isolation-target server.

The transmitting unit 1103 also has a function for transmitting the isolation information D3 generated by the generating unit 1102 to the client apparatus $j. More specifically, for example, by using the task LAN, the transmitting unit 1103 transmits, to the client apparatuses $1 to $4 that are connected, the heartbeat HB3 (for example, see FIG. 7) in which the isolation instruction type "3" is set and to which the isolation information D3 is appended.

The receiving unit 1104 also has a function for receiving, from the client apparatus $j, the isolation information D4 including the number of servers de-isolated by the client apparatus $j and the IP addresses of the de-isolation-target servers. More specifically, for example, by using the task LAN, the receiving unit 1104 receives, from the client apparatus $j, the heartbeat HB4 (for example, see FIG. 8) in which the isolation instruction type "4" is set and to which the isolation information D4 is appended.

The deciding unit 1105 also has a function for deciding whether or not the de-isolation-target server de-isolation processing in the client apparatus $j is completed. More specifically, for example, when the heartbeat HB4 is received from the client apparatus $j, the deciding unit 1105 decides that de-isolation-target server de-isolation processing in the client apparatus $j is completed.

The result of the decision is stored in, for example, the isolation-state management table 900 illustrated in FIG. 9. Now, assume a case in which the heartbeat HB4 is received from the client apparatus $1. In this case, the deciding unit 1105 identifies, in the isolation-state management table 900, the isolation-state management information 900-1 in which the IP address "IP_ADDRESS-1" of the client apparatus $1 is set in the "client address" field. The deciding unit 1105 then sets "1" in the "completion-state" field in the identified isolation-state management information 900-1. As a result, it is possible to determine the client apparatus $j that has completed the de-isolation-target server de-isolation processing.

If no isolation information D4 is received from the client apparatus $j even when the certain amount of time T has passed after the isolation information D3 is transmitted to the client apparatus $j, the deciding unit 1105 decides that the de-isolation-target server de-isolation processing in the client apparatus $j is omissible. The certain amount of time T is, for example, the timeout time T_out for heartbeat communication using the task LAN.

More specifically, if no heartbeat HB4 is received from the client apparatus $j even when the timeout time T_out has passed after the heartbeat HB3 is transmitted to the client apparatus $j, the deciding unit 1105 decides that the de-isolation processing in the client apparatus $j is omissible.

The incorporating unit 1108 has a function for incorporating an incorporation-target server into the cluster system 210. More specifically, for example, the incorporating unit 1108 incorporates an incorporation-target server into the cluster system 210 by synchronizing information with, among the servers #1 to #3 included in the cluster system 210, the servers other than the isolation-target server.

When the incorporation-target server is an isolation-target server, the incorporating unit 1108 incorporates the incorporation-target server into the cluster system 210 when the de-isolation-target server de-isolation processing is completed. The case in which the de-isolation-target server de-isolation processing is completed is a case in which it is decided that the de-isolation-target server de-isolation processing in all of the client apparatuses $1 to $4 that are connected with the server #i is "completed" or is "omissible".

The cluster control unit #i (see FIG. 2) in the server #i is implemented by, for example, the detecting unit 1101, the generating unit 1102, the transmitting unit 1103, the receiving unit 1104, the switching unit 1106, the accepting unit 1107, and the incorporating unit 1108. The communication control unit #i in the server #i is also implemented by, for example, the transmitting unit 1103, the receiving unit 1104, and the deciding unit 1105.

Figure 12:
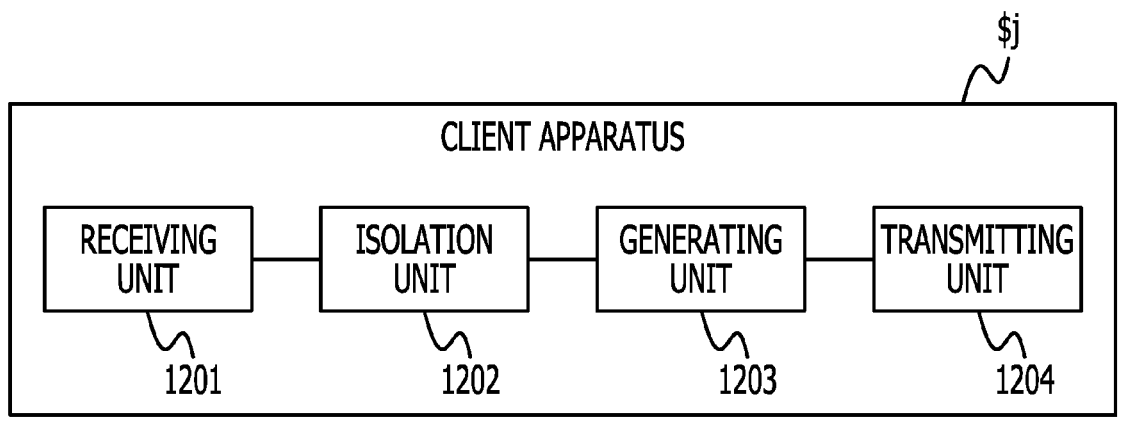
FIG. 12 is a block diagram illustrating an example of the functional configuration of a client apparatus.

FIG. 12 is a block diagram illustrating an example of the functional configuration of the client apparatus $j. As illustrated in FIG. 12, the client apparatus $j includes a receiving unit 1201, an isolating unit 1202, a generating unit 1203, and a transmitting unit 1204. Specifically, the functions of these functional units are realized via the I/F 303 or by the CPU 301 executing a program stored in a storage device, such as the memory 302 or the magnetic disk 305 (illustrated in FIG. 3), in the client apparatus $j. Processing results of the functional units are stored in, for example, a storage device, such as the memory 302 or the magnetic disk 305.

The receiving unit 1201 has a function for receiving the isolation information D1 from the server #i. More specifically, for example, by using the task LAN, the receiving unit 1201 receives, from the server #i, the heartbeat HB1 (for example, see FIGS. 5A and 5B) in which the isolation instruction type "1" is set and to which the isolation information D1 is appended.

The isolating unit 1202 has a function for executing, upon reception of the isolation information D1, the isolation processing for isolating the working server #k identified with the isolation information D1. The "isolation processing" is processing for changing the operation state to a state for discarding data from the working server #k identified with the isolation information D1.

More specifically, for example, the isolating unit 1202 registers, in the isolation-target server list 1000 (see FIG. 10), the IP address(es) of the isolation-target server(s) identified with the isolation information D1 appended to the heartbeat HB1. As a result, the client apparatus $j can identify the IP address(es) of the isolation-target server(s) based on the isolation-target server list 1000 and can also discard data whose transmission-source IP address is included in the IP address(es) of the isolation-target server(s).

That is, even when virtual IP addresses are used to transmit processing requests, responses from the servers can be received from the respective servers. Thus, when the client apparatus $j receives the responses from the servers, it is possible to discard a response from a faulty server. The isolating unit 1202 may also break the connection with the isolation-target server(s) registered in the isolation-target server list 1000.

The generating unit 1203 has a function for generating isolation information D2 including the number of isolated servers and the IP address(es) of the isolated server(s). More specifically, for example, the generating unit 1203 generates isolation information D2 in which the number of isolation-target servers and the IP address(es) of the isolation-target server(s) which are registered in the isolation-target server list 1000 are set.

The transmitting unit 1204 has a function for transmitting the isolation information D2 generated by the generating unit 1203 to the server #i. More specifically, for example, when the isolation-target server isolation processing is completed, the transmitting unit 1204 uses the task LAN to transmit, to the server #i, the heartbeat HB2 (for example, see FIGS. 6A and 6B) in which the isolation instruction type "2" is set and to which the isolation information D2 is appended.

In this case, the transmitting unit 1204 may use the virtual IP addresses, assigned to the servers #1 to #3, to transmit the heartbeat HB2 to all of the servers #1 to #3 including the working server #k in which a fault was detected. As a result, for example, the working server #k in which the fault was detected can recognize that the local working server #k has a fault when it can receive the heartbeat HB2.

The receiving unit 1201 also has a function for receiving the isolation information D3 from the server #i. More specifically, for example, by using the task LAN, the receiving unit 1201 receives, from the server #i, the heartbeat HB3 (for example, see FIG. 7) in which the isolation instruction type "3" is set and to which the isolation information D3 is appended.

The isolating unit 1202 also has a function for executing, upon reception of the isolation information D3, de-isolation processing for de-isolating the de-isolation-target server(s) identified with the isolation information D3. The "de-isolation processing" is processing for releasing the state for discarding data from the de-isolation-target server(s) identified with the isolation information D3.

More specifically, for example, the isolating unit 1202 deletes, from the isolation-target server list 1000, the IP address(es) of the de-isolation-target server(s) identified with the isolation information D3 appended to the heartbeat HB3. After the deletion, the client apparatus $j may accept data from the de-isolated server(s). In this case, when connection with the de-isolated server(s) is broken, the isolating unit 1202 may also establish connection with the de-isolated server(s).

The generating unit 1203 has a function for generating isolation information D4 including the number of de-isolated servers and the IP address(es) of the de-isolated server(s). More specifically, for example, the generating unit 1203 generates isolation information D4 in which the number of de-isolated servers and the IP address(es) of the de-isolated server(s) which were deleted from the isolation-target server list 1000 are set.

The transmitting unit 1204 has a function for transmitting the isolation information D4 generated by the generating unit 1203 to the server #i. More specifically, for example, when the de-isolation-target server de-isolation processing is completed, the transmitting unit 1204 uses the task LAN to transmit, to the server #i, the heartbeat HB4 (for example, see FIG. 8) in which the isolation instruction type "4" is set and to which the isolation information D4 is appended.

The communication control unit $j in the client apparatus $j is realized by, for example, the receiving unit 1201, the isolating unit 1202, the generating unit 1203, and the transmitting unit 1204.

Next, an example of the operation of the information processing system 200 during execution of failover will be described with reference to FIGS. 13 to 15. In this case, it is assumed that the switching-source server (the working server #k) is a "server #1" and the switching-target server (the standby server #i) is a "server #2".

Figure 13:
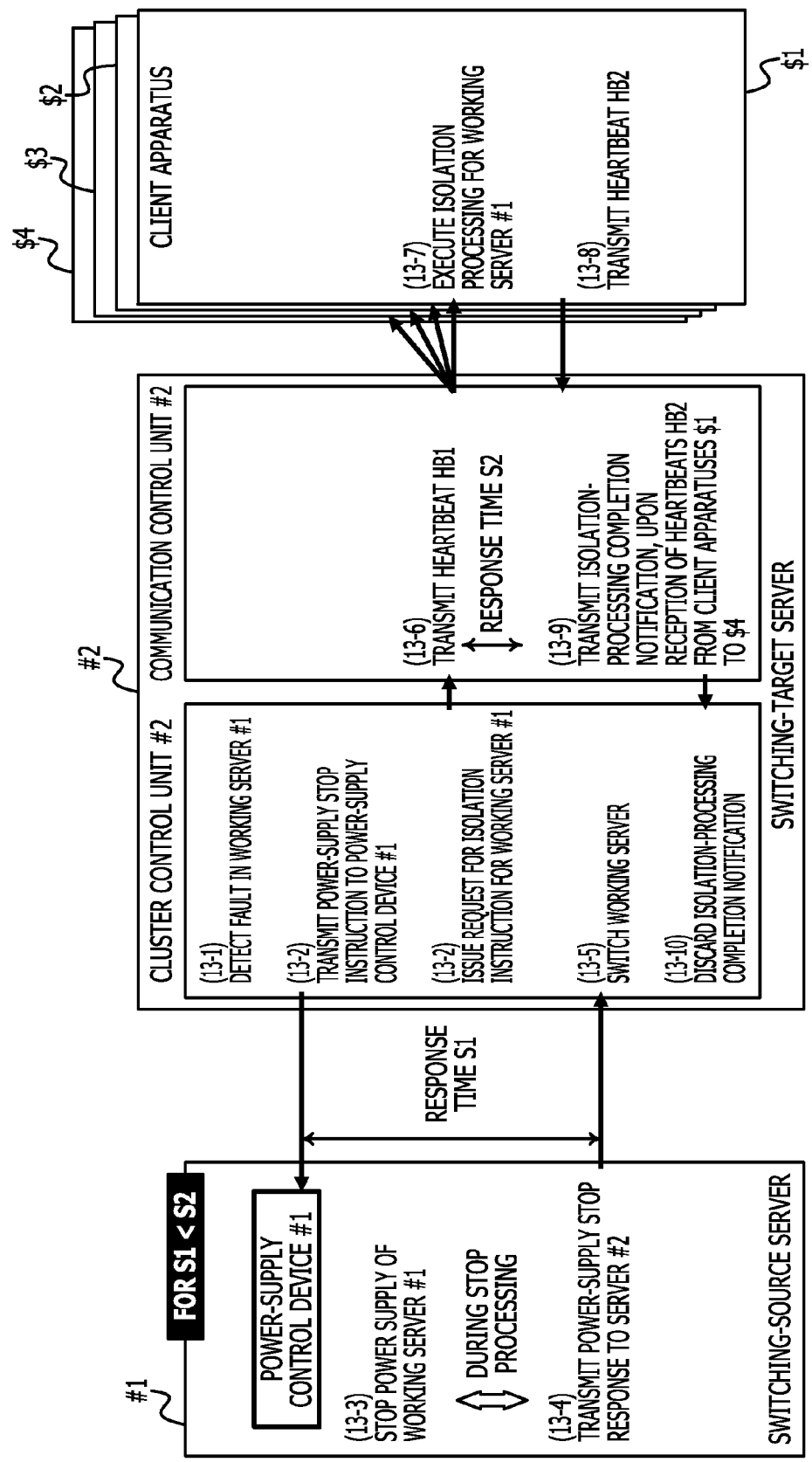
FIG. 13 is a diagram illustrating an example of operation during execution of failover.

FIG. 13 is a diagram illustrating an example of operation during execution of failover. At (13-1) in FIG. 13, the cluster control unit #2 in the server #2 detects a fault in the working server #1. At (13-2), the cluster control unit #2 transmits a power-supply stop instruction to the power-supply control device #1 in the working server #1 and also requests the communication control unit #2 in the server #2 to issue, to all of the client apparatuses $1 to $4, an isolation instruction for isolating the working server #1.

In this case, assume a case in which the power-supply control device #1 in the working server #1 is operating properly and the network leading to the power-supply control device #1 has no fault.

At (13-3), upon receiving the power-supply stop instruction from the server #2, the power-supply control device #1 in the working server #1 stops the power supply of the working server #1. At (13-4), upon stopping the power supply of the working server #1, the power-supply control device #1 transmits a power-supply stop response to the server #2.

At (13-5), upon reception of the power-supply stop response from the power-supply control device #1, the cluster control unit #2 switches the working server from the server #1 to the local server #2. At (13-6), in response to the isolation instruction from the cluster control unit #2, the communication control unit #2 uses the task LAN to transmit the heartbeat HB1 to all of the client apparatuses $1 to $4 that are connected.

In this case, assume a case in which each of the client apparatuses $1 to $4 can operate properly and the network leading to each of the client apparatuses $1 to $4 has no fault.

At (13-7), upon receiving the heartbeat HB1 from the server #2, each of the client apparatuses $1 to $4 executes isolation processing for isolating the working server #1. At (13-8), upon completing the isolation processing for isolating the working server #1, each of the client apparatuses $1 to $4 transmits the heartbeat HB2 to the server #2 by using the task LAN.

At (13-9), upon reception of the heartbeats HB2 from all of the client apparatuses $1 to $4 that are connected, the communication control unit #2 transmits, to the cluster control unit #2, a notification indicating that the working server #1 isolation processing is completed. At (13-10), upon completing the working-server switching processing, the communication control unit #2 discards the isolation-processing completion notification from the cluster control unit #2.

When the working server #1 power-supply stop processing performed by the power-supply control device #1 is completed earlier than the working server #1 isolation processing in all of the client apparatuses $1 to $4 (response time S1<response time S2), the server switching is performed at a timing when the power-supply stop response is received from the power-supply control device #1.

Figure 14:
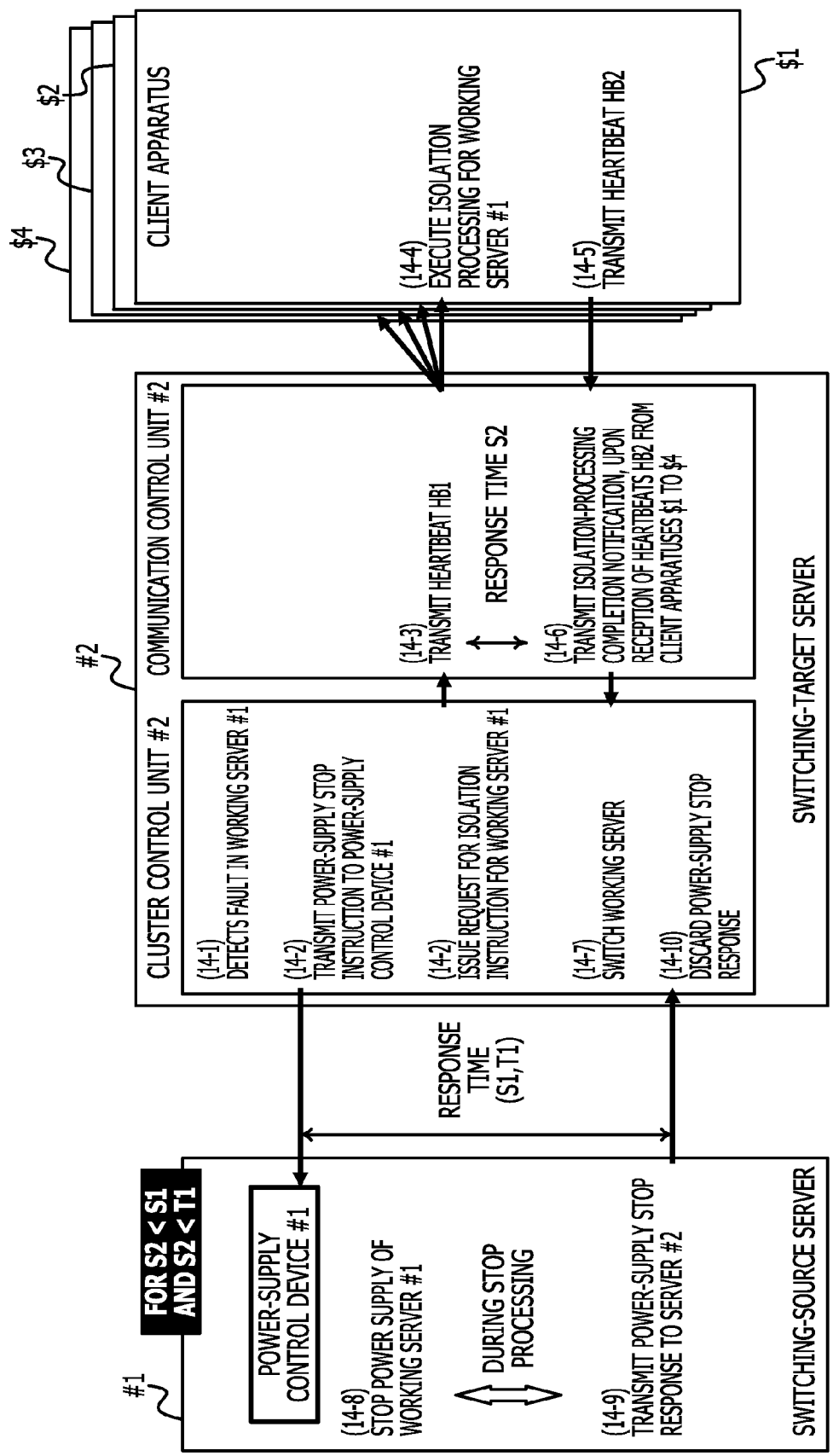
FIG. 14 is a diagram illustrating an example of operation during execution of failover.

FIG. 14 is a diagram illustrating an example of operation during execution of failover. At (14-1) in FIG. 14, the cluster control unit #2 in the server #2 detects a fault in the working server #1. At (14-2), the cluster control unit #2 transmits a power-supply stop instruction to the power-supply control device #1 in the working server #1 and also requests the communication control unit #2 in the server #2 to issue, to all of the client apparatuses $1 to $4, an isolation instruction for isolating the working server #1.

In this case, assume a case in which the power-supply control device #1 in the working server #1 is operating properly and the network leading to the power-supply control device #1 has no fault. Also, assume a case in which each of the client apparatuses $1 to $4 can operate properly and the network leading to each of the client apparatuses $1 to $4 has no fault.

At (14-3), in response to the isolation instruction from the cluster control unit #2, the communication control unit #2 uses the task LAN to transmit the heartbeat HB1 to all of the client apparatuses $1 to $4 that are connected. At (14-4), upon receiving the heartbeat HB1 from the server #2, each of the client apparatuses $1 to $4 executes isolation processing for isolating the working server #1.

At (14-5), upon completing the isolation processing for isolating the working server #1, each of the client apparatuses $1 to $4 transmits the heartbeat HB2 to the server #2 by using the task LAN. At (14-6), upon reception of the heartbeats HB2 from all of the client apparatuses $1 to $4 that are connected, the communication control unit #2 transmits, to the cluster control unit #2, a notification indicating that the working server #1 isolation processing is completed.

At (14-7), upon receiving the isolation-processing completion notification from the communication control unit #2, the cluster control unit #2 switches the working server from the server #1 to the local server #2.

At (14-8), upon receiving the power-supply stop instruction from the server #2, the power-supply control device #1 in the working server #1 stops the power supply of the working server #1. At (14-9), upon stopping the power supply of the working server #1, the power-supply control device #1 transmits a power-supply stop response to the server #2. At (14-10), upon completing the working-server switching processing, the cluster control unit #2 discards the power-supply stop response received from the power-supply control device #1.

When the working server #1 isolation processing performed by all of the client apparatuses $1 to $4 is completed earlier than the working server #1 power-supply stop processing performed by the power-supply control device #1 (the response time S2<the response time S1), the server switching is performed at a timing when the isolation-processing completion notification is received from the communication control unit #2.

A sequence that is the same as or similar to that described above is also performed when a fault occurs in the power-supply control device #1 in the working server #1 or in the network leading to the power-supply control device #1. In this case, the response time S1 is a timeout time T1 of the power-supply control device #1 (S1<T1). That is, even if a processing delay or a fault occurs in the power-supply stop processing performed by the power-supply control device #1, the server switching can be reliably completed within the response time S2 (S2<T1).

Figure 15:
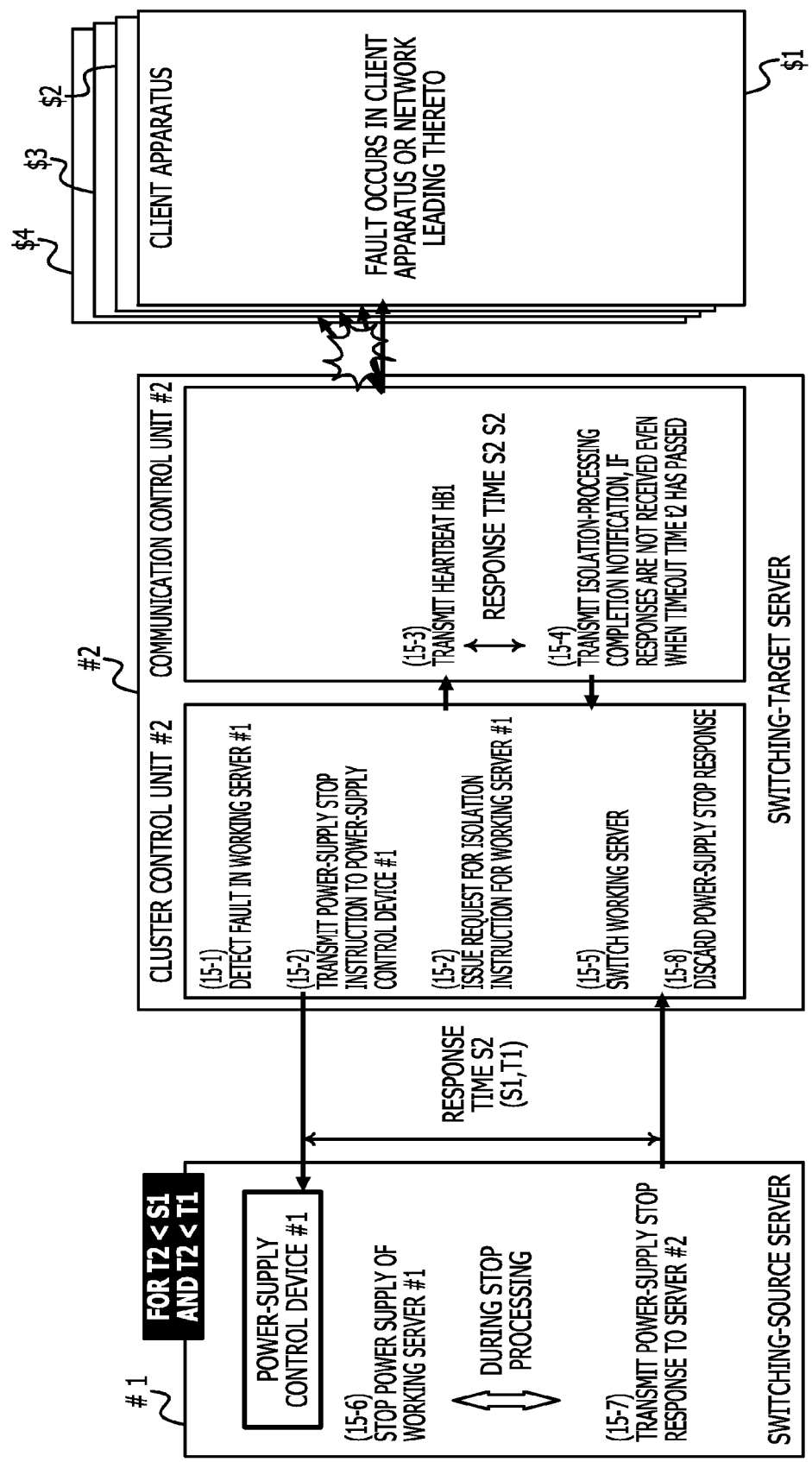
FIG. 15 is a diagram illustrating an example of operation during execution of failover.

FIG. 15 is a diagram illustrating an example of operation during execution of failover. At (15-1) in FIG. 15, the cluster control unit #2 in the server #2 detects a fault in the working server #1. At (15-2), the cluster control unit #2 transmits a power-supply stop instruction to the power-supply control device #1 in the working server #1 and also requests the communication control unit #2 in the server #2 to issue, to all of the client apparatuses $1 to $4, an isolation instruction for isolating the working server #1.

In this case, assume a case in which the power-supply control device #1 in the working server #1 is operating properly and the network leading to the power-supply control device #1 has no fault. It is also assumed that a fault has occurred in the client apparatuses $1 to $4 or in the network leading to the client apparatuses $1 to $4.

At (15-3), in response to the isolation instruction from the cluster control unit #2, the communication control unit #2 uses the task LAN to transmit the heartbeat HB1 to all of the client apparatuses $1 to $4 that are connected. At (15-4), if responses (the heartbeats HB2) are not received from all of the client apparatuses $1 to $4 even when a timeout time T2 has passed after the heartbeat HB is transmitted to the client apparatuses $1 to $4, the cluster control unit #2 transmits, to the communication control unit #2, a notification indicating that the working server #1 isolation-processing is completed. The timeout time T2 is the above-described timeout time T_out.

At (15-5), upon receiving the isolation-processing completion notification from the communication control unit #2, the cluster control unit #2 switches the working server from the server #1 to the local server #2.

At (15-6), upon receiving the power-supply stop instruction from the server #2, the power-supply control device #1 in the working server #1 stops the power supply of the working server #1. At (15-7), upon stopping the power supply of the working server #1, the power-supply control device #1 transmits a power-supply stop response to the server #2. At (15-8), upon completing the working-server switching processing, the cluster control unit #2 discards the power-supply stop response received from the power-supply control device #1.

When the working server #1 isolation processing performed by all of the client apparatuses $1 to $4 is completed earlier than the working server #1 power-supply stop processing performed by the power-supply control device #1 (the response time T2<the response time S1), the server switching is performed at a timing when the isolation-processing completion notification is received from the communication control unit #2.

A sequence that is the same as or similar to that described above is also performed when a fault occurs in the power-supply control device #1 in the working server #1 or in the network leading to the power-supply control device #1. In this case, the response time S1 is the timeout time T1 of the power-supply control device #1 (S1<T1). That is, even if a processing delay or a fault occurs in the power-supply stop processing performed by the power-supply control device #1, the server switching can be reliably completed within the response time T2 (T2<T1).

Next, a description will be given of various procedures of processing performed by the information processing system 200 according to the first embodiment. First, a description will be given of a procedure of first switching processing for a standby server. The first switching processing is performed when a standby server newly becomes a working server (a switching-target server).

Figure 16:
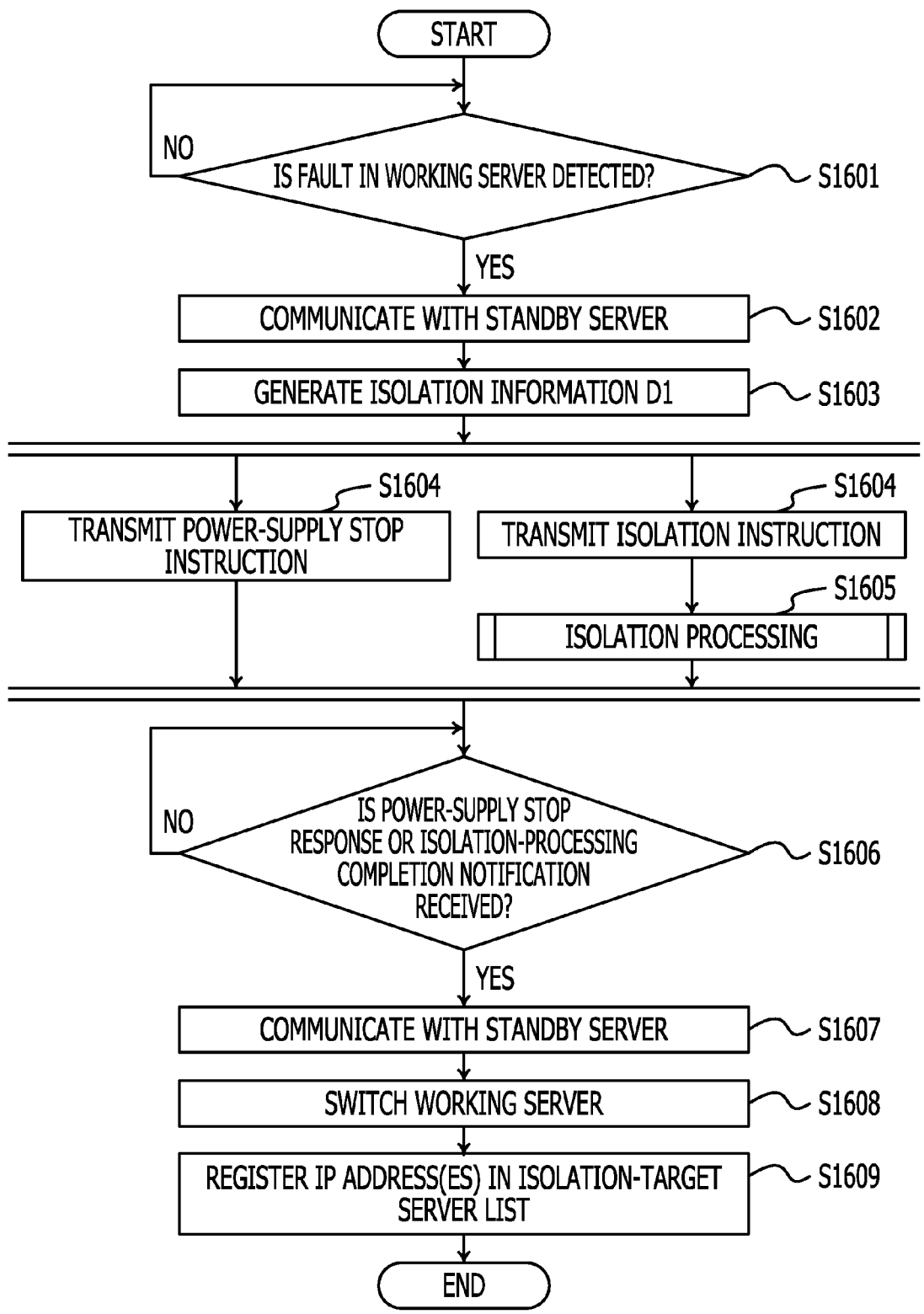
FIG. 16 is a flowchart illustrating an example of a procedure of first switching processing performed by a standby server.

A description will be given of the procedure of the first switching processing performed by the standby server. FIG. 16 is a flowchart illustrating an example of the procedure of the first switching processing performed by the standby server. In the flowchart illustrated in FIG. 16, first, the cluster control unit #i in the server #i decides whether or not a fault is detected in the working server #k (step S1601).

In this example, the cluster control unit #i waits for detection of a fault in the working server #k (NO in step S1601). When a fault in the working server #k is detected (YES in step S1601), the cluster control unit #i communicates with the standby server to share the fault in the working server #k with the standby server (step S1602).

Next, by referring to the isolation-target server list 1000, the cluster control unit #i generates isolation information D1 including the number of isolation-target servers and the IP address(es) of the isolation-target server(s) (step S1603). The cluster control unit #i then transmits a power-supply stop instruction to the power-supply control device #k in the working server #k and also transmits an isolation-target server isolation instruction to the communication control unit #i (step S1604).

Next, the communication control unit #i executes the isolation-target server isolation processing (step S1605). The cluster control unit #i decides whether or not a power-supply stop response from the power-supply control device #k or an isolation-processing completion notification from the communication control unit #i is received (step S1606).

In this example, the cluster control unit #i waits for reception of a power-supply stop response or an isolation-processing completion notification (NO in step S1606). When a power-supply stop response or an isolation-processing completion notification is received (YES in step S1606), the cluster control unit #i communicates with the standby server to share the states of the servers (the working server, the standby server, and the isolated server(s)) (step S1607).

Next, the cluster control unit #i switches the working server from the server #k to the local server #i (step S1608). The cluster control unit #i then registers the IP address(es) of the isolated server(s) in the isolation-target server list 1000 (step S1609) and ends the series of processes in this flowchart.

As a result of the above-described processing, when the power-supply stop response is received from the power-supply control device #k or when the isolation-target server isolation processing in the client apparatuses $1 to $4 is "completed" or is "omissible", the isolation-target server isolation processing may be completed. It is also possible to switch the working server from the server #k to the local server #i.

In step S1604, although the cluster control unit #i executes the processing for transmitting the power-supply stop instruction and the processing for transmitting the isolation instruction in parallel, the present embodiment is not limited thereto. For example, after transmitting the power-supply stop instruction to the power-supply control device #k in the working server #k, the cluster control unit #i may transmit the isolation-target server isolation instruction to the communication control unit #i. After transmitting the isolation-target server isolation instruction to the communication control unit #i, the cluster control unit #i may also transmit the power-supply stop instruction to the power-supply control device #k in the working server #k.

Next, a specific procedure of the isolation processing in step S1605 in FIG. 16 will be described with reference to FIGS. 17 and 18.

Figure 17:
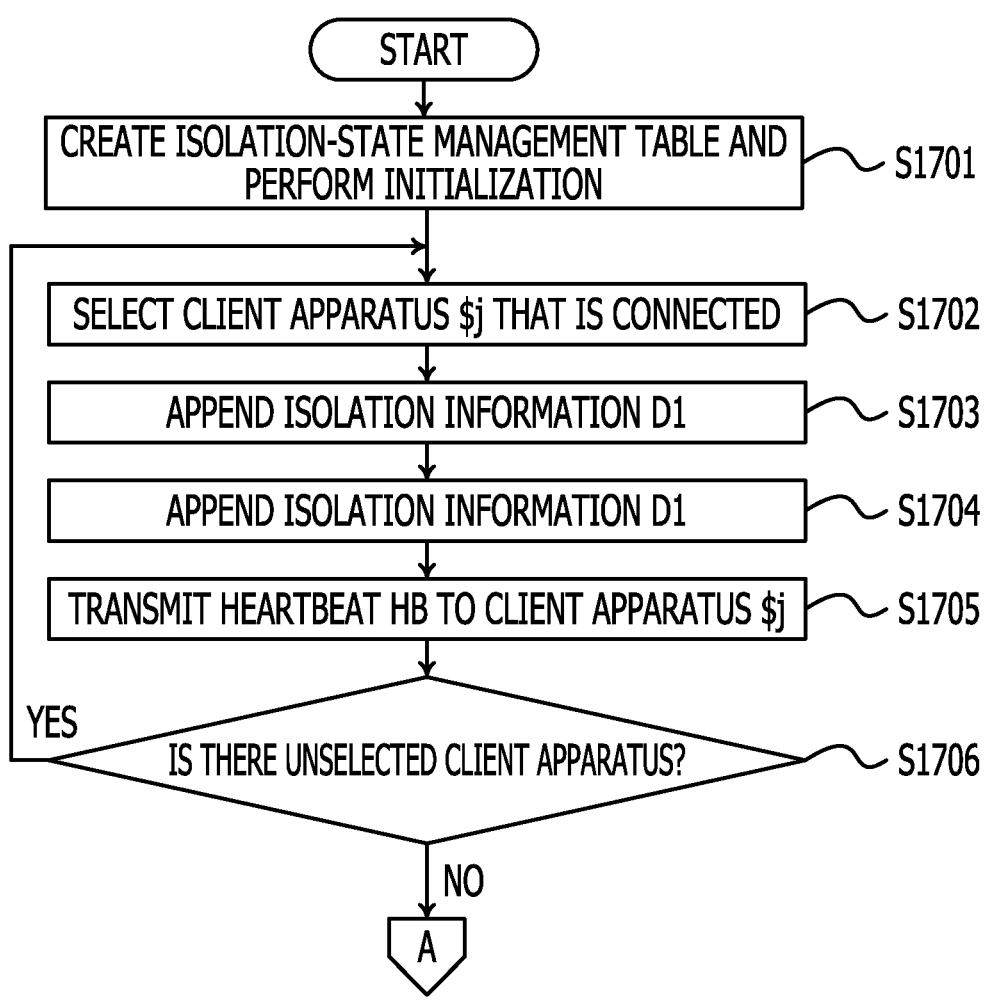
FIG. 17 is a flowchart illustrating an example of a procedure of isolation processing performed by a standby server.
Figure 18:
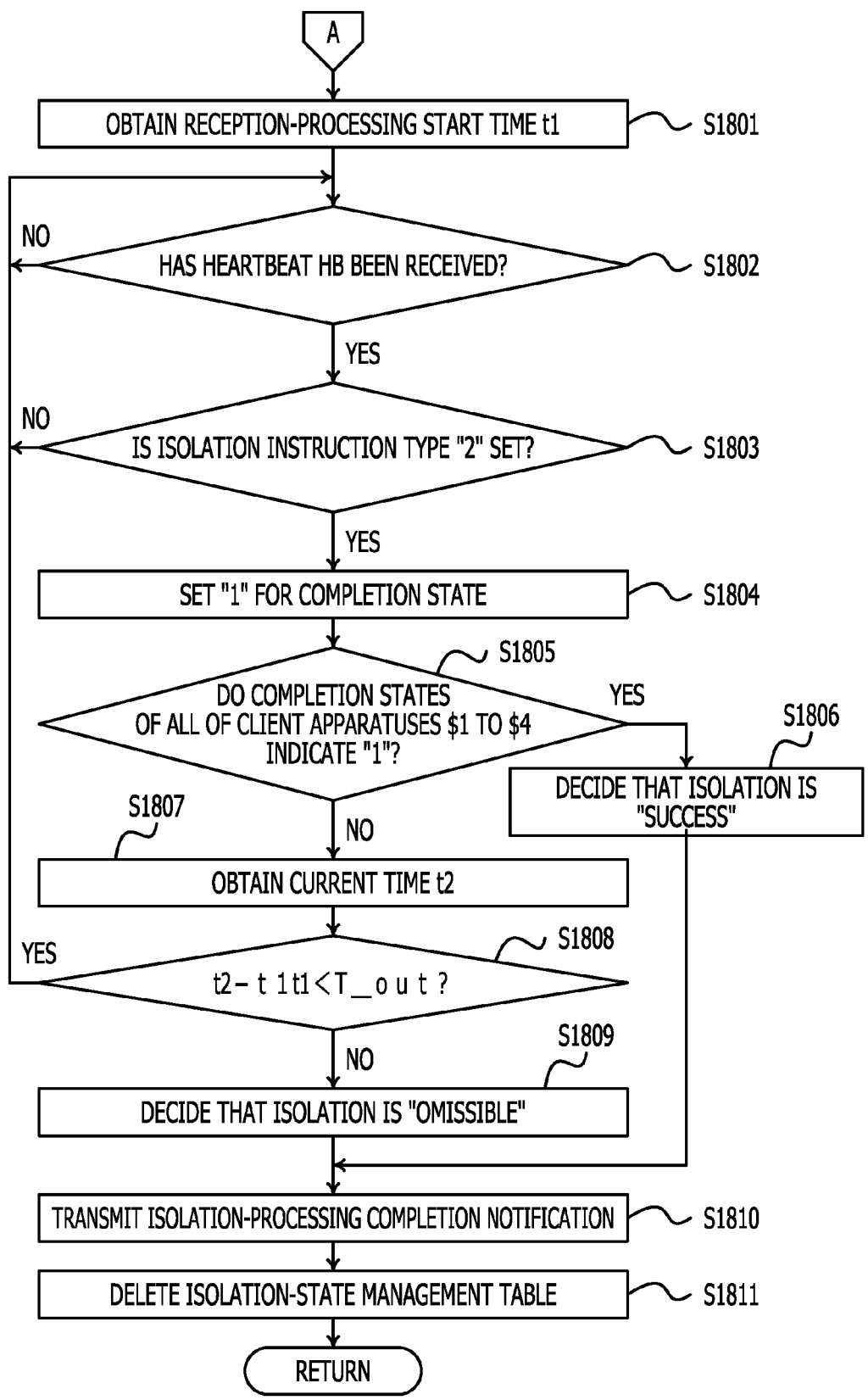
FIG. 18 is a flowchart illustrating an example of the procedure of isolation processing performed by the standby server.

FIGS. 17 and 18 are flowcharts illustrating an example of a procedure of isolation processing performed by a standby server. In the flowchart in FIG. 17, first, the communication control unit #i in the server #i creates an isolation-state management table 900 and performs initialization (step S1701). Next, the communication control unit #i selects one client apparatus $j from the client apparatuses $1 to $4 that are connected (step S1702).

The communication control unit #i then creates a heartbeat HB for the client apparatus $j (step S1703). Next, the communication control unit #i sets the isolation instruction type "1" in the created heartbeat HB and also appends the isolation information D1 thereto (step S1704). The communication control unit #i then transmits the heartbeat HB to the client apparatus $j by using the task LAN (step S1705).

Next, the communication control unit #i decides whether or not there is a client apparatus that is unselected from the client apparatuses $1 to $4 that are connected (step S1706).

When there is an unselected client apparatus (YES in step S1706), the process of the communication control unit #i returns to step S1702.

On the other hand, when there is no unselected client apparatus (NO in step S1706), the process of the communication control unit #i proceeds to step S1801 illustrated in FIG. 18.

In the flowchart in FIG. 18, first, the communication control unit #i obtains reception-processing start time t1 (step S1801). The reception-processing start time t1 is, for example, the current time at this point in time. Next, the communication control unit #i decides whether or not a heartbeat HB has been received from the client apparatus $j (step S1802).

In this example, the communication control unit #i waits for reception of a heartbeat HB from each client apparatus $j (NO in step S1802). Upon receiving a heartbeat HB from the client apparatus $j (YES in step S1802), the communication control unit #i decides whether or not the isolation instruction type "2" is set in the received heartbeat HB (step S1803).

When the isolation instruction type "2" is not set (NO in step S1803), the process of the communication control unit #i returns to step S1802. On the other hand, when the isolation instruction type "2" is set (YES in step S1803), the communication control unit #i sets "1" for the completion state of the client apparatus $j in the isolation-state management table 900 (step S1804).

Next, by referring to the isolation-state management table 900, the communication control unit #i decides whether or not the completion states of all of the client apparatuses $1 to $4 indicate "1" (step S1805). When the completion states of all of the client apparatuses $1 to $4 indicate "1" (YES in step S1805), the communication control unit #i decides that the isolation-target server isolation is a "success" (step S1806). The process then proceeds to step S1810.

On the other hand, when the completion states of all of the client apparatuses $1 to $4 do not indicate "1" (NO in step S1805), the communication control unit #i obtains current time t2 (step S1807). The communication control unit #i then decides whether or not the elapsed time from the reception-processing start time t1 to the current time t2 is smaller than the timeout time T_out (step S1808).

When the elapsed time is smaller than the timeout time T_out (YES in step S1808), the process of the communication control unit #i returns to step S1802. On the other hand, when the elapsed time is larger than or equal to the timeout time T_out (NO in step S1808), the communication control unit #i decides that the isolation-target server isolation is "omissible" (step S1809).

Next, the communication control unit #i transmits an isolation-processing completion notification to the cluster control unit #i (step S1810). The communication control unit #i then deletes the isolation-state management table 900 (step S1811), and the process returns to the step in which the isolation processing was called.

As a result of the above-described processing, when it is decided that the isolation-target server isolation processing in all of the client apparatuses $1 to $4 that are connected is "completed" or is "omissible", the isolation-target server isolation processing may be completed.

Next, a description will be given of a procedure of second switching processing performed by a standby server. The second switching processing is performed when a standby server does not newly become a working server (a switching-target server).

Figure 19:
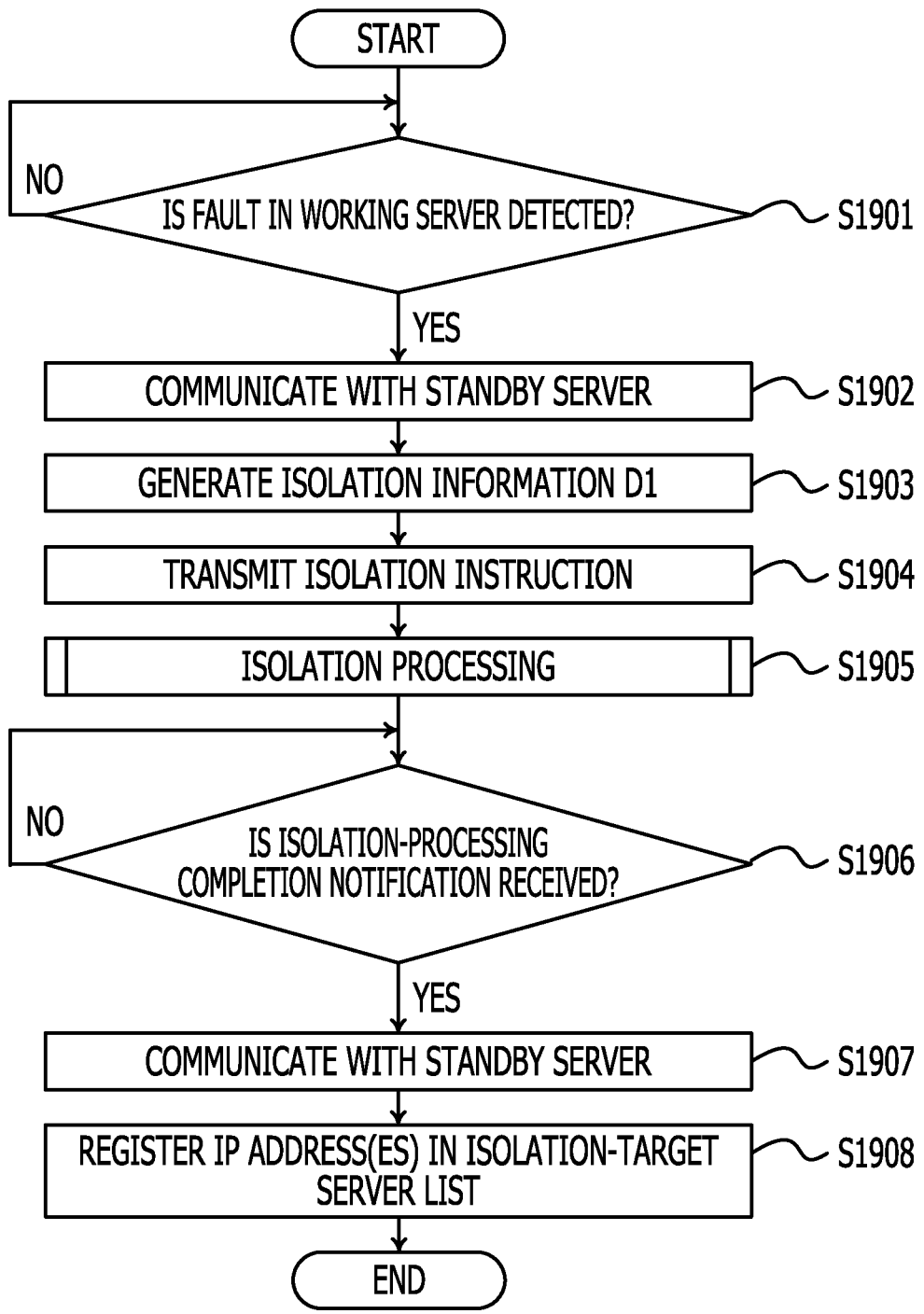
FIG. 19 is a flowchart illustrating an example of a procedure of second switching processing performed by a standby server.

FIG. 19 is a flowchart illustrating an example of a procedure of the second switching processing performed by a standby server. In the flowchart in FIG. 19, first, the cluster control unit #i in the server #i decides whether or not a fault is detected in the working server #k (step S1901).

In this example, the cluster control unit #i waits for detection of a fault in the working server #k (NO in step S1901). Upon detecting a fault in the working server #k (YES in step S1901), the cluster control unit #i communicates with the standby server to share the fault in the working server #k with the standby server (step S1902).

Next, by referring to the isolation-target server list 1000, the cluster control unit #i generates isolation information D1 including the number of isolation-target servers and the IP address(es) of the isolation-target server(s) (step S1903). The cluster control unit #i transmits an isolation-target server isolation instruction to the communication control unit #i (step S1904).

The communication control unit #i executes the isolation-target server isolation processing (step S1905). The cluster control unit #i then decides whether or not an isolation-processing completion notification from the communication control unit #i is received (step S1906).

In this example, the cluster control unit #i waits for reception of an isolation-processing completion notification (NO in step S1906). When an isolation-processing completion notification is received (YES in step S1906), the cluster control unit #i communicates with the standby server to share the states of the servers (the working server, the standby server, and the isolated server(s)) (step S1907).

Next, the cluster control unit #i registers the IP address(es) of the isolation-target server(s) in the isolation-target server list 1000 (step S1908) and then ends the series of processes in this flowchart.

As a result, when the isolation-target server isolation processing in the client apparatuses $1 to $4 is "completed" or is "omissible", the isolation-target server isolation processing may be completed.

Next, a procedure of heartbeat reception processing performed by the client apparatus $j will be described with reference to FIG. 20.

Figure 20:
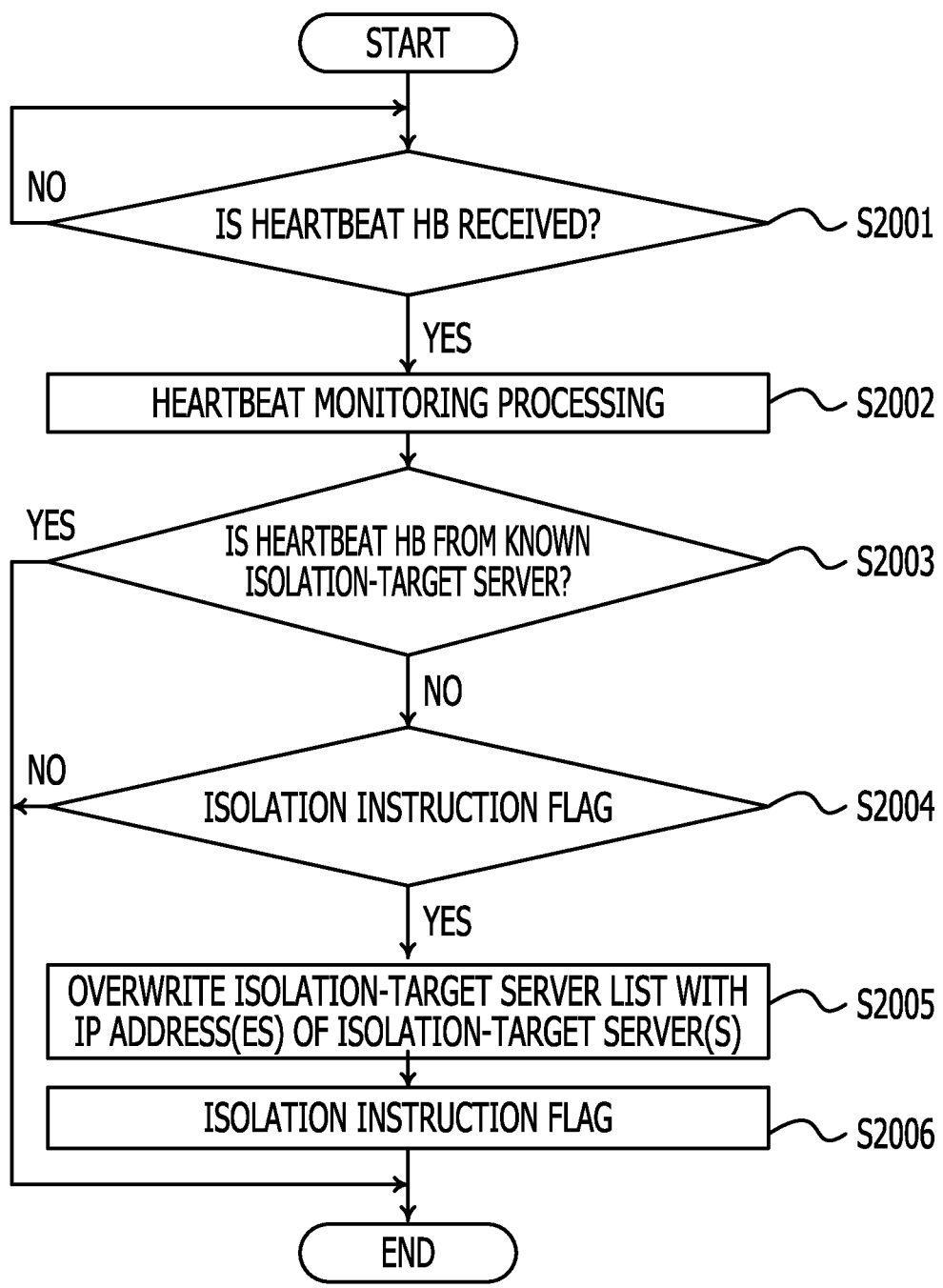
FIG. 20 is a flowchart illustrating an example of a procedure of heartbeat reception processing performed by the client apparatus.

FIG. 20 is a flowchart illustrating an example of the procedure of heartbeat reception processing performed by the client apparatus $j. In the flowchart in FIG. 20, first, the client apparatus $j decides whether or not a heartbeat HB is received from the server #i (step S2001).

In this example, the client apparatus $j waits for reception of a heartbeat HB from the server #i (NO in step S2001). Upon receiving a heartbeat HB from the server #i (YES in step S2001), the client apparatus $j executes heartbeat monitoring processing (step S2002). The heartbeat monitoring processing is processing for performing connection monitoring, fault determination, and so on.

Next, by referring to the isolation-target server list 1000, the client apparatus $j decides whether or not the received heartbeat HB is a heartbeat HB from a known isolation-target server (step S2003). When the received heartbeat HB is a heartbeat HB from a known isolation-target server (YES in step S2003), the client apparatus $j ends the series of processes in this flowchart.

On the other hand, when the received heartbeat HB is not a heartbeat HB from a known isolation-target server (NO in step S2003), the client apparatus $j decides whether or not the isolation instruction type "1" is set in the heartbeat HB (step S2004). When the isolation instruction type "1" is not set in the heartbeat HB (NO in step S2004), the client apparatus $j ends the series of processes in this flowchart.

On the other hand, when the isolation instruction type "1" is set (YES in step S2004), the client apparatus $j overwrites the isolation-target server list 1000 with the IP address(es) of the isolation-target server(s) included in the isolation information D1 (step S2005). The client apparatus $j then changes an isolation instruction flag from "0" to "1" (step S2006) and then ends the series of processes in this flowchart.

As a result of the above-described processing, it is possible to isolate the isolation-target server identified with the isolation information D1 appended to heartbeat HB from the server #i.

A procedure of heartbeat transmission processing performed by the client apparatus $j will be described with reference to FIG. 21.

Figure 21:
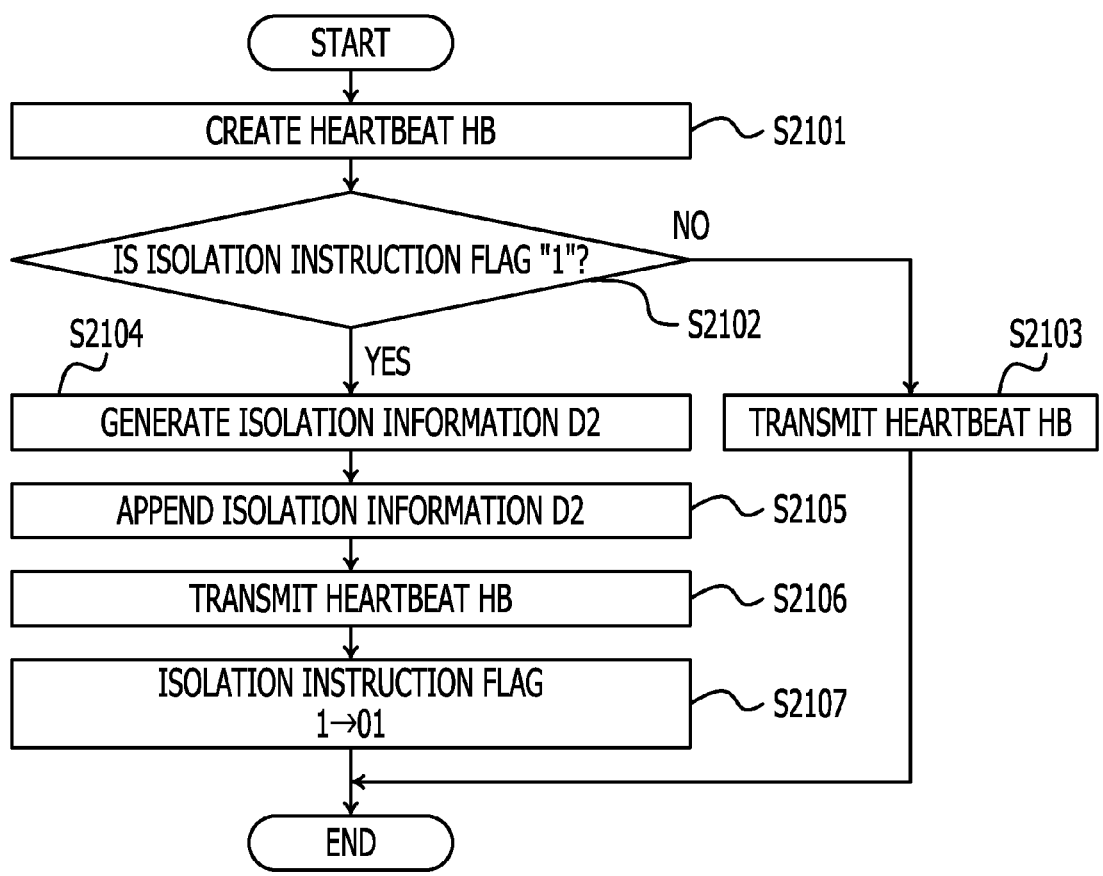
FIG. 21 is a flowchart illustrating an example of a procedure of heartbeat transmission processing performed by the client apparatus.

FIG. 21 is a flowchart illustrating an example of a procedure of heartbeat transmission processing performed by the client apparatus $j. In the flowchart illustrated in FIG. 21, first, the client apparatus $j creates a heartbeat HB for the server #i (step S2101). Next, the client apparatus $j decides whether or not the isolation instruction flag is "1" (step S2102).

When the isolation instruction flag is "0" (NO in step S2102), the client apparatus $j transmits the created heartbeat HB to the server #i by using the task LAN (step S2103) and then ends the series of processes in this flowchart.

On the other hand, when the isolation instruction flag is "1" (YES in step S2102), the client apparatus $j generates isolation information D2 in which the number of isolation-target servers and the IP address(es) of the isolation-target server(s) which were registered in the isolation-target server list 1000 are set (step S2104).

The client apparatus $j then sets the isolation instruction type "2" in the created heartbeat HB and also appends the isolation information D2 thereto (step S2105). Next, the client apparatus $j transmits the heartbeat HB to the server #i by using the task LAN (step S2106).

The client apparatus $j then changes the isolation instruction flag from "1" to "0" (step S2107) and then ends the series of processes in this flowchart. As a result of the above-described processing, an isolation instruction response indicating that the isolation-target server isolation processing is completed can be issued to the server #i.

Next, a procedure of data processing performed by the client apparatus $j will be described with reference to FIG. 22.

Figure 22:
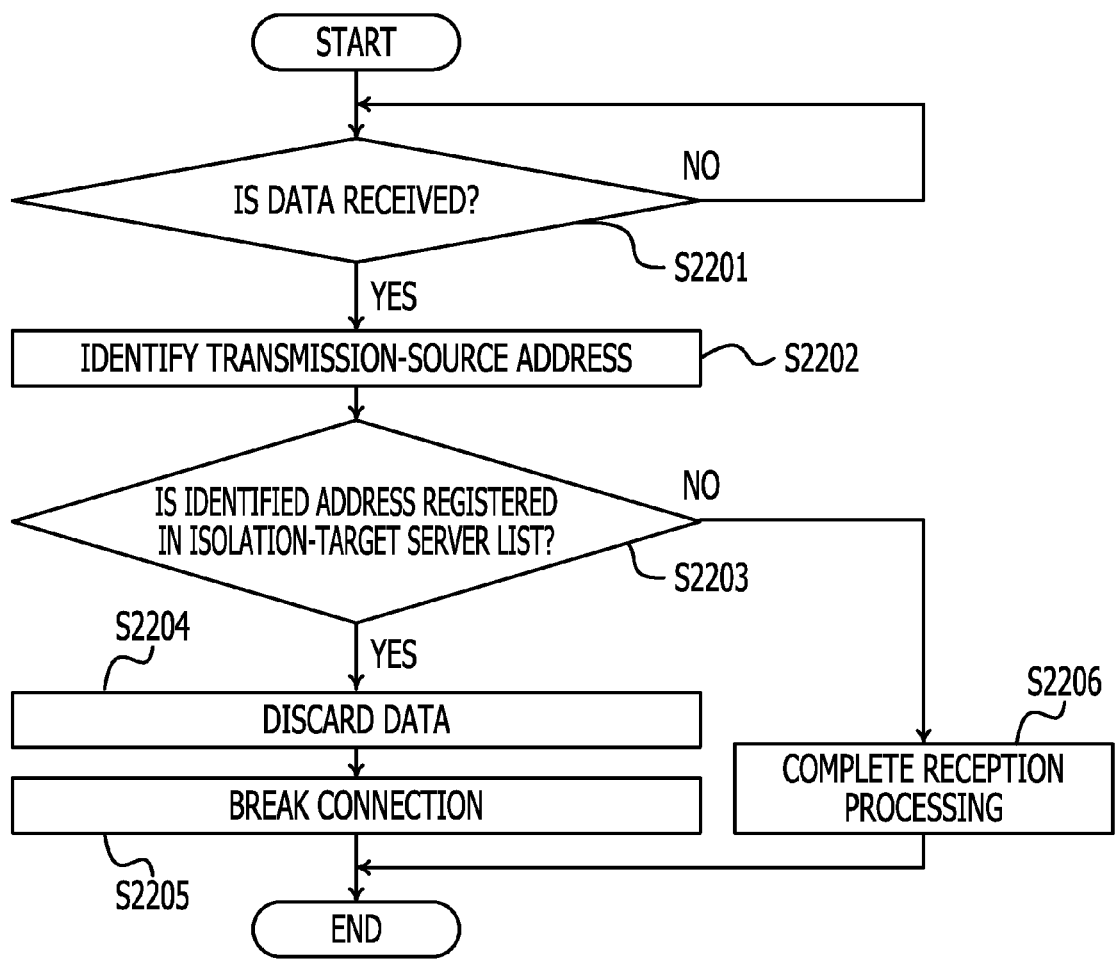
FIG. 22 is a flowchart illustrating an example of the procedure of data processing performed by the client apparatus.

FIG. 22 is a flowchart illustrating an example of the procedure of data processing performed by the client apparatus $j. In the flowchart in FIG. 22, first, the client apparatus $j decides whether or not data is received from the server #i (step S2201).

In this example, the client apparatus $j waits for reception of data from the server #i (NO in step S2201). Upon receiving data from the server #i (YES in step S2201), the client apparatus $j identifies the transmission-source address of the received data (step S2202).

Next, the client apparatus $j decides whether or not the identified transmission-source address is registered in the isolation-target server list 1000 (step S2203). When the identified transmission-source address is registered in the isolation-target server list 1000 (YES in step S2203), the client apparatus $j discards the received data (step S2204).

The client apparatus $j then breaks the connection with the server #i (step S2205) and then ends the series of processes in this flowchart. As a result of the above-described processing, it is possible to discard data from the isolation-target server.

When it is decided in step S2203 that the identified transmission-source address is not registered in the isolation-target server list 1000 (NO in step S2203), the client apparatus $j completes the data reception processing (step S2206) and then ends the series of processes in this flowchart.

Next, a procedure of heartbeat reception processing performed by the server #i will be described with reference to FIG. 23.

Figure 23:
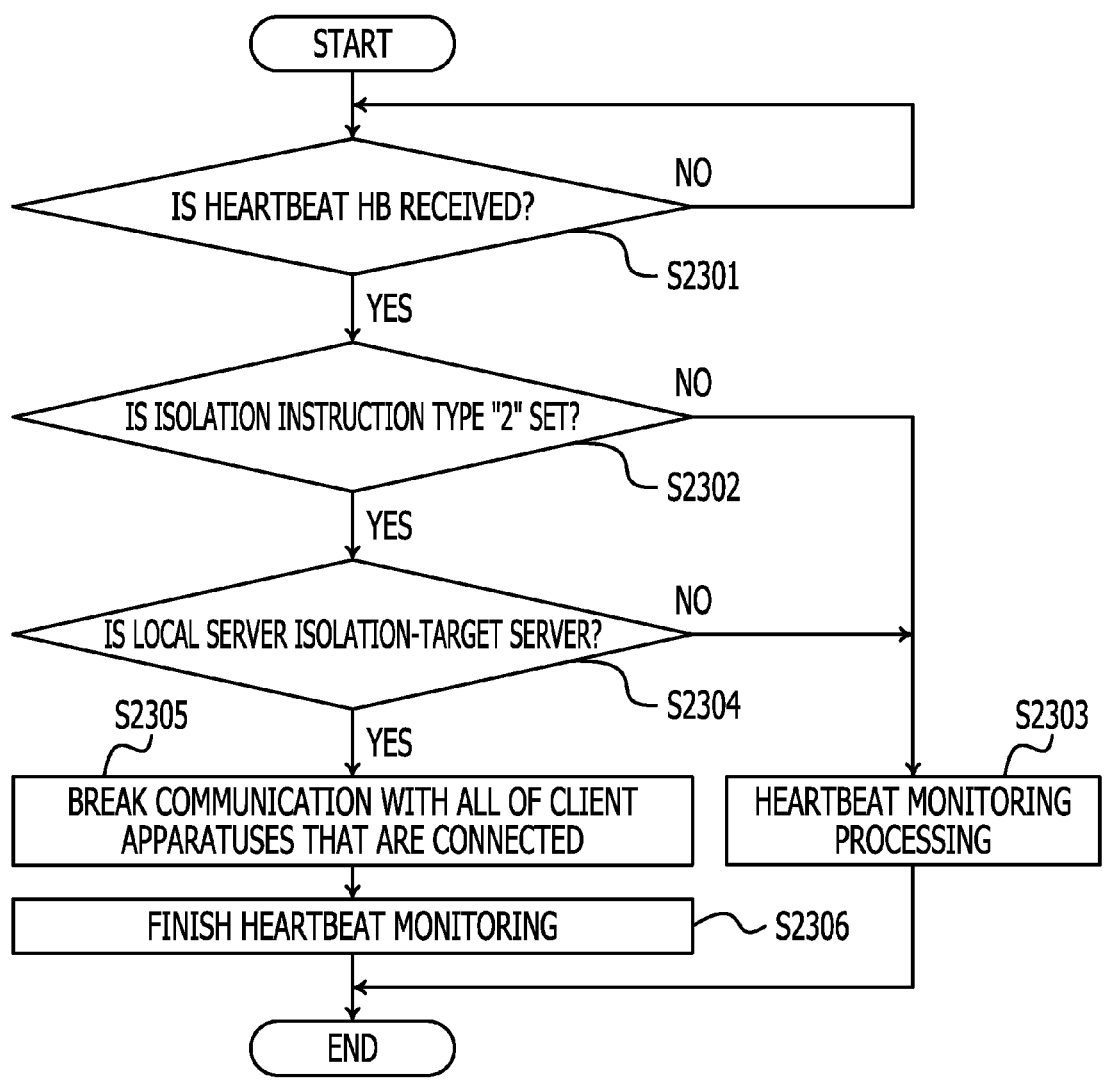
FIG. 23 is a flowchart illustrating an example of a procedure of heartbeat reception processing performed by the server.

FIG. 23 is a flowchart illustrating an example of the procedure of heartbeat reception processing performed by the server #i. In the flowchart in FIG. 23, first, the server #i decides whether or not a heartbeat HB is received from the client apparatus $j (step S2301).

In this example, the server #i waits for reception of a heartbeat HB from each client apparatus $j (NO in step S2301). Upon receiving a heartbeat HB from the client apparatus $j (YES in step S2301), the server #i decides whether or not the isolation instruction type "2" is set in the received heartbeat HB (step S2302).

When the isolation instruction type "2" is not set (NO in step S2302), the server #i executes the heartbeat monitoring processing (step S2303) and then ends the series of processes in this flowchart.

On the other hand, when the isolation instruction type "2" is set (YES in step S2302), the server #i decides whether or not the local server #i is an isolation-target server by referring to the isolation information D2 appended to the heartbeat HB (step S2304). When the local server #i is not an isolation-target server (NO in step S2304), the process of the server #i proceeds to step S2303.

On the other hand, when the local server is an isolation-target server (YES in step S2304), the server #i breaks communication with all of the client apparatuses $1 to $4 that are connected (step S2305). The server #i then finishes the heartbeat monitoring using the task LAN (step S2306) and ends the series of processes in this flowchart.

As a result of the above-described processing, a determination as to whether or not the local server #i is an isolation-target server can be made based on the isolation information D2 appended to the heartbeat HB from the client apparatus $j, and when the local server #i is an isolation-target server, it is possible to break communication with the client apparatuses $1 to $4 that are connected.

Next, a procedure of working-server incorporation processing will be described with reference to FIG. 24. This incorporation processing is processing when a working server accepts an incorporation-target server incorporate instruction. Assume a case in which the incorporation-target server has already been started up by the administrator or the like of the information processing system 200.

Figure 24:
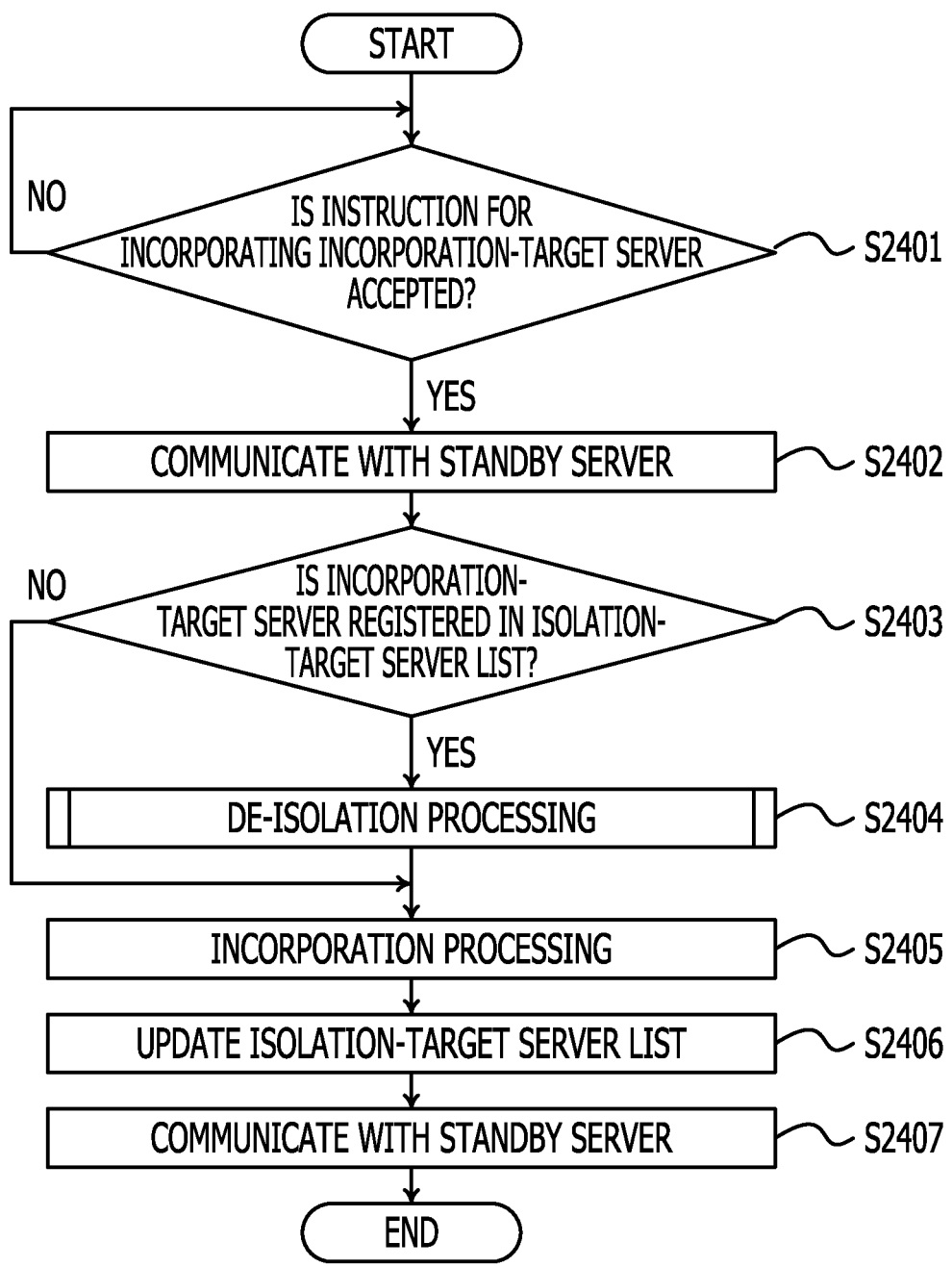
FIG. 24 is a flowchart illustrating an example of a procedure of working-server incorporation processing.

FIG. 24 is a flowchart illustrating an example of a procedure of working-server incorporation processing. In the flowchart in FIG. 24, first, the server #i decides whether or not an instruction for incorporating an incorporation-target server is accepted (step S2401).

In this example, the server #i waits for acceptance of an instruction for incorporating an incorporation-target server (NO in step S2401). Upon receiving an instruction for incorporating an incorporation-target server (YES in step S2401), the server #i communicates with the standby server to share the incorporation-target server with the standby server (step S2402).

Next, the server #i decides whether or not the incorporation-target server is registered in the isolation-target server list 1000 (step S2403). When the incorporation-target server is not registered in the isolation-target server list 1000 (NO in step S2403), the process of the server #i proceeds to step S2405.

On the other hand, when the incorporation-target server is registered in the isolation-target server list 1000 (YES in step S2403), the server #i executes the processing for de-isolating the incorporation-target server (step S2404). The server #i then executes processing for incorporating the incorporation-target server (step S2405). The incorporation processing is processing for incorporating the incorporation-target server into the cluster system 210.

Next, the server #i updates the isolation-target server list 1000 (step S2406). More specifically, for example, when the incorporation-target server is registered in the isolation-target server list 1000, the server #i deletes the incorporation-target server from the isolation-target server list 1000.

The server #i then communicates with the standby server to complete the incorporation-target server incorporation processing (step S2407) and then ends the series of processes in this flowchart. As a result of the above-described processing, it is possible to incorporate the incorporation-target server into the cluster system 210.

Since a procedure of standby server incorporation processing is analogous to the above-described procedure of the working-server incorporation processing, an illustration and a description thereof are not given hereinafter. Specifically, for example, after communicating with the working server in step S2402, the standby server performs processes that are similar to the processes in steps S2403 to S2407.

Next, a specific procedure of the de-isolation processing in step S2404 illustrated in FIG. 24 will be described with reference to FIGS. 25 and 26.

Figure 25:
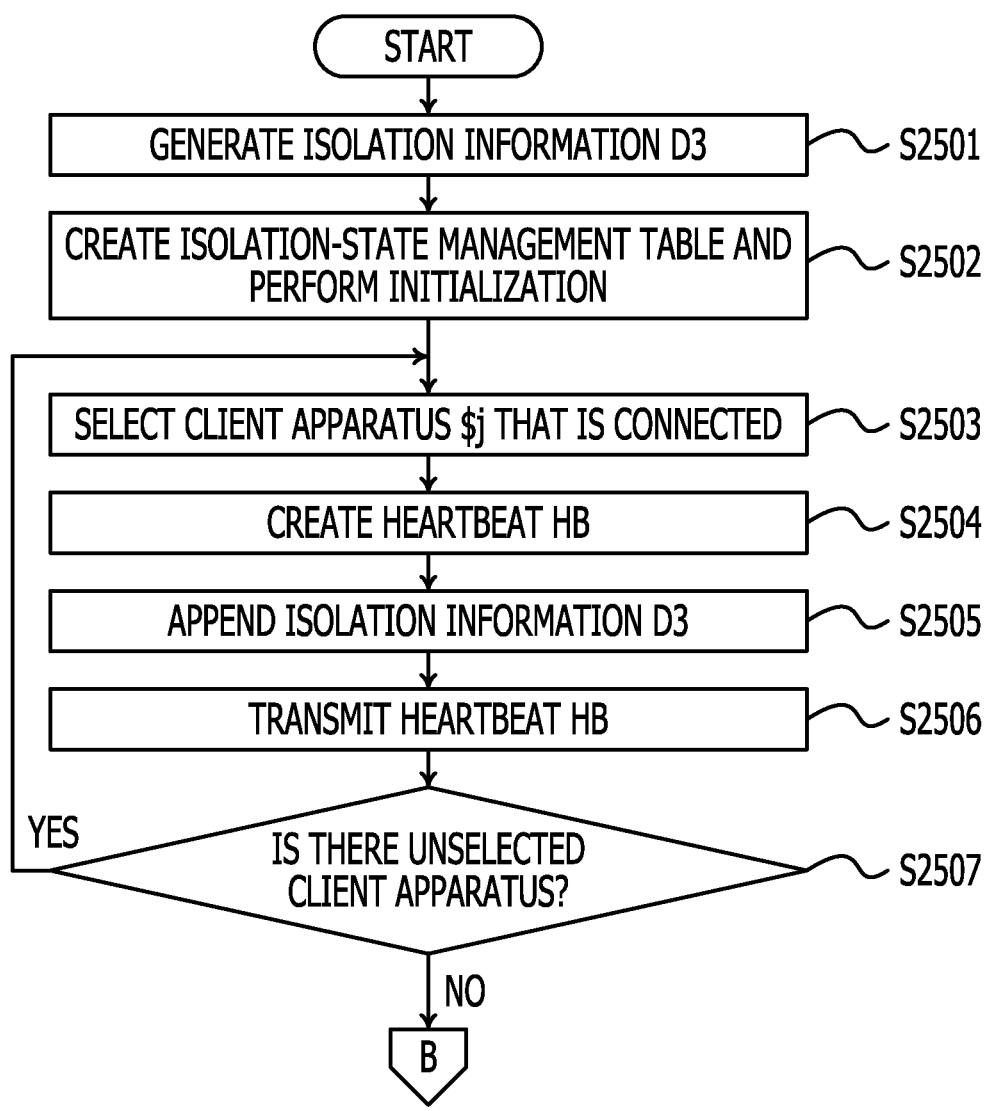
FIG. 25 is a flowchart illustrating an example of a procedure of working-server de-isolation processing.
Figure 26:
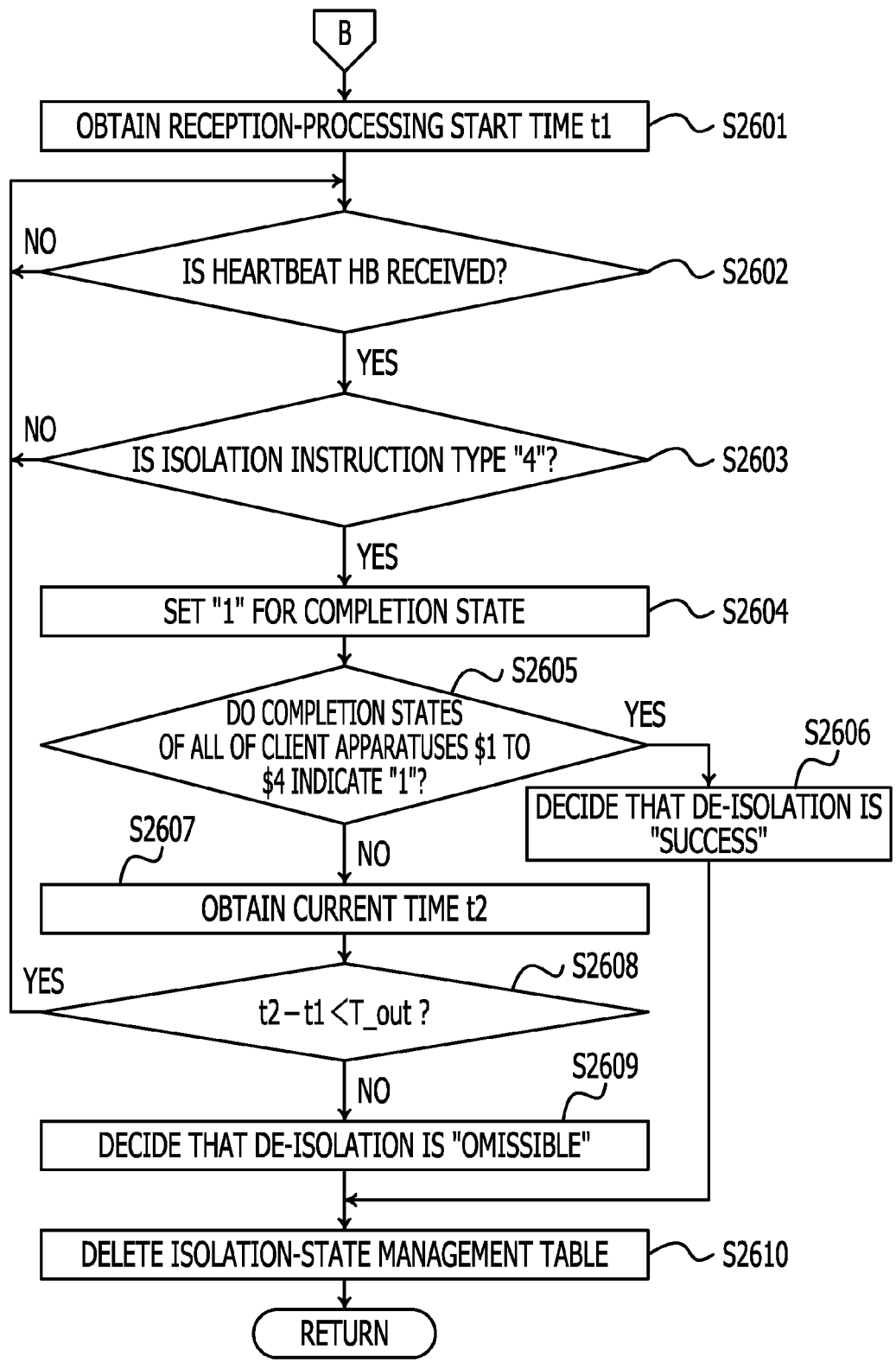
FIG. 26 is a flowchart illustrating an example of the procedure of working-server de-isolation processing.

FIGS. 25 and 26 are flowcharts illustrating an example of the procedure of the working-server de-isolation processing. In the flowchart in FIG. 25, first, the server #i generates the isolation information D3 including the number of de-isolation-target servers and the IP addresses of the de-isolation-target servers (step S2501). The de-isolation-target servers are incorporation-target servers registered in the isolation-target server list 1000.

After step S2501, the server #i creates an isolation-state management table 900 and performs initialization (step S2502). Next, the server #i selects one client apparatus $j from the client apparatuses $1 to $4 that are connected (step S2503).

The server #i then creates a heartbeat HB for the client apparatus $j (step S2504). Next, the server #i sets the isolation instruction type "3" in the created heartbeat HB and appends the isolation information D3 thereto (step S2505). The server #i then transmits the heartbeat HB to the client apparatus $j by using the task LAN (step S2506).

Next, the server #i decides whether or not there is a client apparatus that is unselected from the client apparatuses $1 to $4 that are connected (step S2507). When there is an unselected client apparatus (YES in step S2507), the process of the server #i returns to step S2503.

On the other hand, when there is no unselected client apparatus (NO in step S2507), the process of the server #i proceeds to step S2601 illustrated in FIG. 26.

In the flowchart in FIG. 26, first, the server #i obtains the reception-processing start time t1 (step S2601). Next, the server #i decides whether or not a heartbeat HB is received from the client apparatus $j (step S2602).

In this example, the server #i waits for reception of a heartbeat HB from each client apparatus $j (NO in step S2602). Upon receiving a heartbeat HB from the client apparatus $j (YES in step S2602), the server #i decides whether or not the isolation instruction type "4" is set in the received heartbeat HB (step S2603).

When the isolation instruction type "4" is not set (NO in step S2603), the process of the server #i returns to step S2602. On the other hand, when the isolation instruction type "4" is set (YES in step S2603), the server #i sets "1" for the completion state of the client apparatus $j in the isolation-state management table 900 (step S2604).

Next, by referring to the isolation-state management table 900, the server #i decides whether or not the completion states of all of the client apparatuses $1 to $4 indicate "1" (step S2605). When the completion states of all of the client apparatuses $1 to $4 indicate "1" (YES in step S2605), the server #i decides that the isolation-target server de-isolation is a "success" (step S2606), and the process proceeds to step S2610.

On the other hand, when the completion states of all of the client apparatuses $1 to $4 do not indicate "1" (NO in step S2605), the server #i obtains current time t2 (step S2607). The server #i then decides whether or not the elapsed time from the reception-processing start time t1 to the current time t2 is smaller than the timeout time T_out (step S2608).

When the elapsed time is smaller than the timeout time T_out (YES in step S2608), the process of the server #i returns to step S2602. On the other hand, when the elapsed time is larger than or equal to the timeout time T_out (NO in step S2608), the server #i decides that the isolation-target server de-isolation is "omissible" (step S2609).

The server #i deletes the isolation-state management table 900 (step S2610), and the process returns to the step in which the de-isolation processing was called.

As a result of the above-described processing, upon deciding that the de-isolation-target server de-isolation processing in all of the client apparatuses $1 to $4 that are connected is "completed" or is "omissible", the de-isolation-target server de-isolation processing may be completed.

Next, a procedure of incorporation-target server incorporation processing will be described with reference to FIG. 27. This incorporation processing is processing when an incorporation-target server accepts an incorporation-target server incorporate instruction. In this case, the incorporation-target server is referred to as a "server #i".

Figure 27:
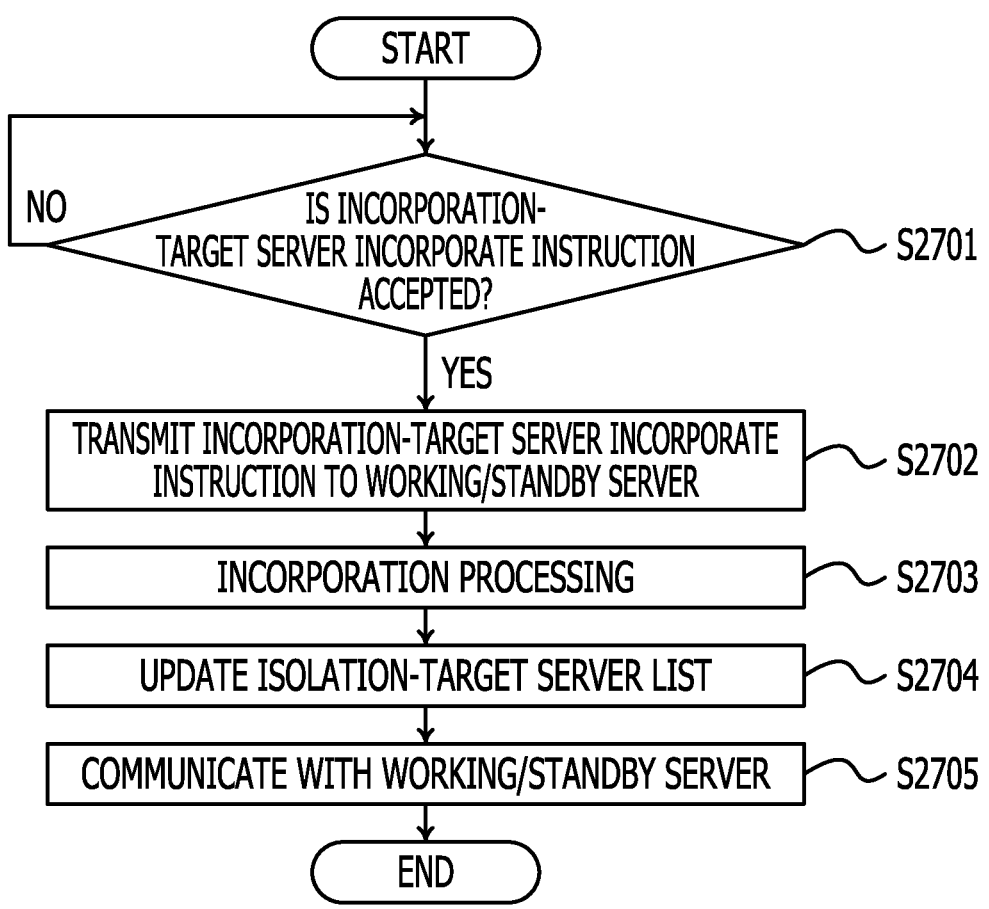
FIG. 27 is a flowchart illustrating an example of a procedure of incorporation-target server incorporation processing.

FIG. 27 is a flowchart illustrating an example of a procedure of incorporation-target server incorporation processing. In the flowchart in FIG. 27, first, the server #i decides whether or not an incorporation-target server incorporate instruction is accepted (step S2701).

In this example, the server #i waits for acceptance of an incorporation-target server incorporate instruction (NO in step S2701). Upon accepting an incorporation-target server incorporate instruction (YES in step S2701), the server #i transmits an incorporation-target server incorporate instruction to the working/standby server (step S2702).

Next, the server #i executes local-server incorporation processing (step S2703). The server #i then updates the isolation-target server list 1000 (step S2704). Next, the server #i communicates with the working/standby server to thereby complete the incorporation-target server incorporation processing (step S2705) and then ends the series of processes in this flowchart. As a result of the above-described processing, it is possible to incorporate the local server into the cluster system 210.

Next, a procedure of heartbeat reception processing performed by the client apparatus $j will be described with reference to FIG. 28.

Figure 28:
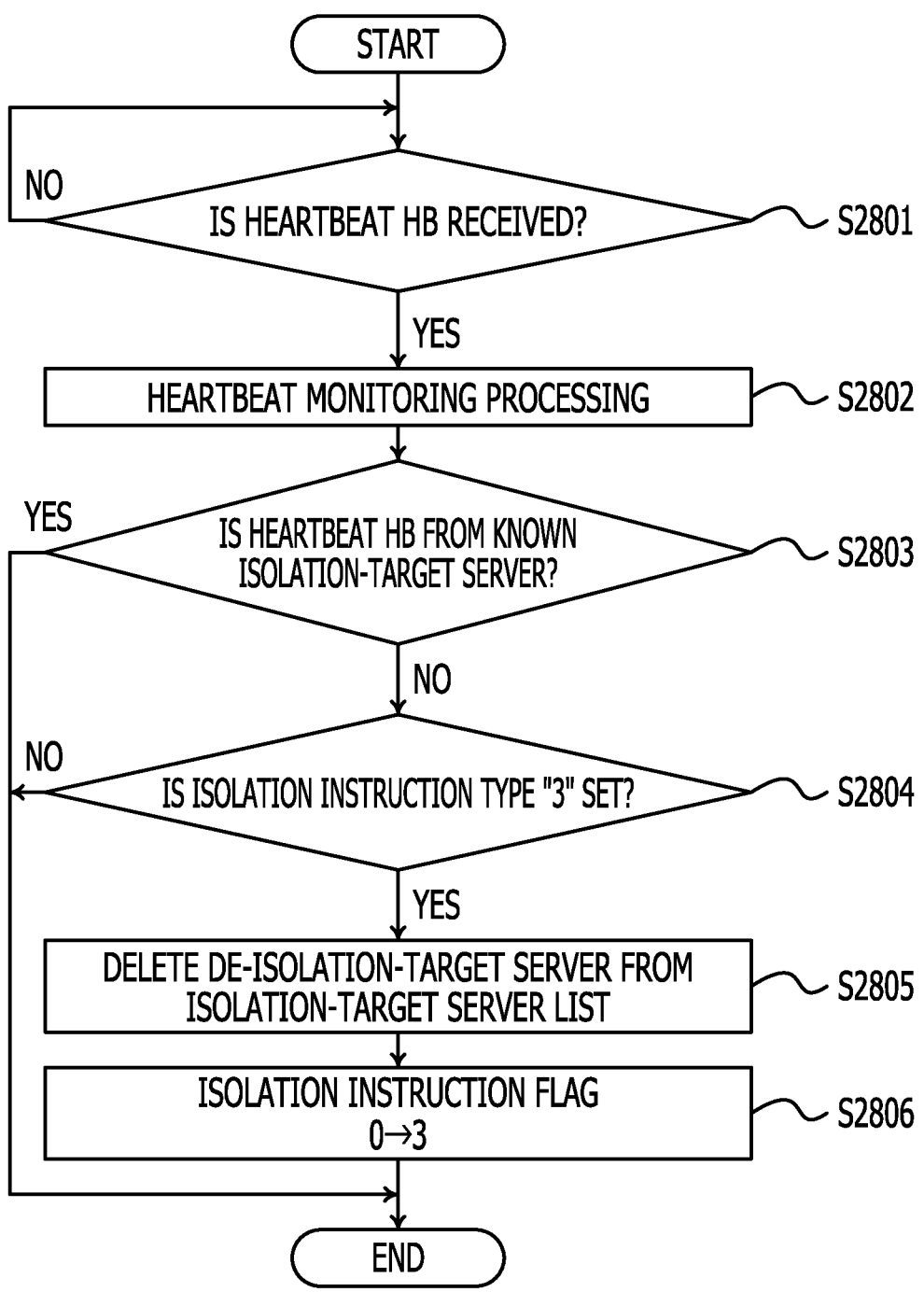
FIG. 28 is a flowchart illustrating an example of a procedure of heartbeat reception processing performed by the client apparatus.

FIG. 28 is a flowchart illustrating an example of the procedure of heartbeat reception processing performed by the client apparatus $j. In the flowchart in FIG. 28, first, the client apparatus $j decides whether or not a heartbeat HB is received from the server #i (step S2801).

In this example, the client apparatus $j waits for reception of a heartbeat HB from the server #i (NO in step S2801).

Upon receiving a heartbeat HB from the server #i (YES in step S2801), the client apparatus $j executes the heartbeat monitoring processing (step S2802).

Next, by referring to the isolation-target server list 1000, the client apparatus $j decides whether or not the received heartbeat HB is a heartbeat HB from a known isolation-target server (step S2803). When the received heartbeat HB is a heartbeat HB from a known isolation-target server (YES in step S2803), the client apparatus $j ends the series of processes in this flowchart.

On the other hand, when the received heartbeat HB is not a heartbeat HB from a known isolation-target server (NO in step S2803), the client apparatus $j decides whether or not the isolation instruction type "3" is set in the heartbeat HB (step S2804). When the isolation instruction type "3" is not set (NO in step S2804), the client apparatus $j ends the series of processes in this flowchart.

On the other hand, when the isolation instruction type "3" is set (YES in step S2804), the client apparatus $j deletes, from the isolation-target server list 1000, the IP address(es) of the de-isolation-target server(s) included in the isolation information D3 appended to the heartbeat HB (step S2805). The client apparatus $j then changes the isolation instruction flag from "0" to "3" (step S2806) and ends the series of processes in this flowchart.

As a result of the above-described processing, it is possible to release the isolation state of the de-isolation-target server identified with the isolation information D3 appended to the heartbeat HB from the server #i.

Next, a procedure of heartbeat transmission processing performed by the client apparatus $j will be described with reference to FIG. 29.

Figure 29:
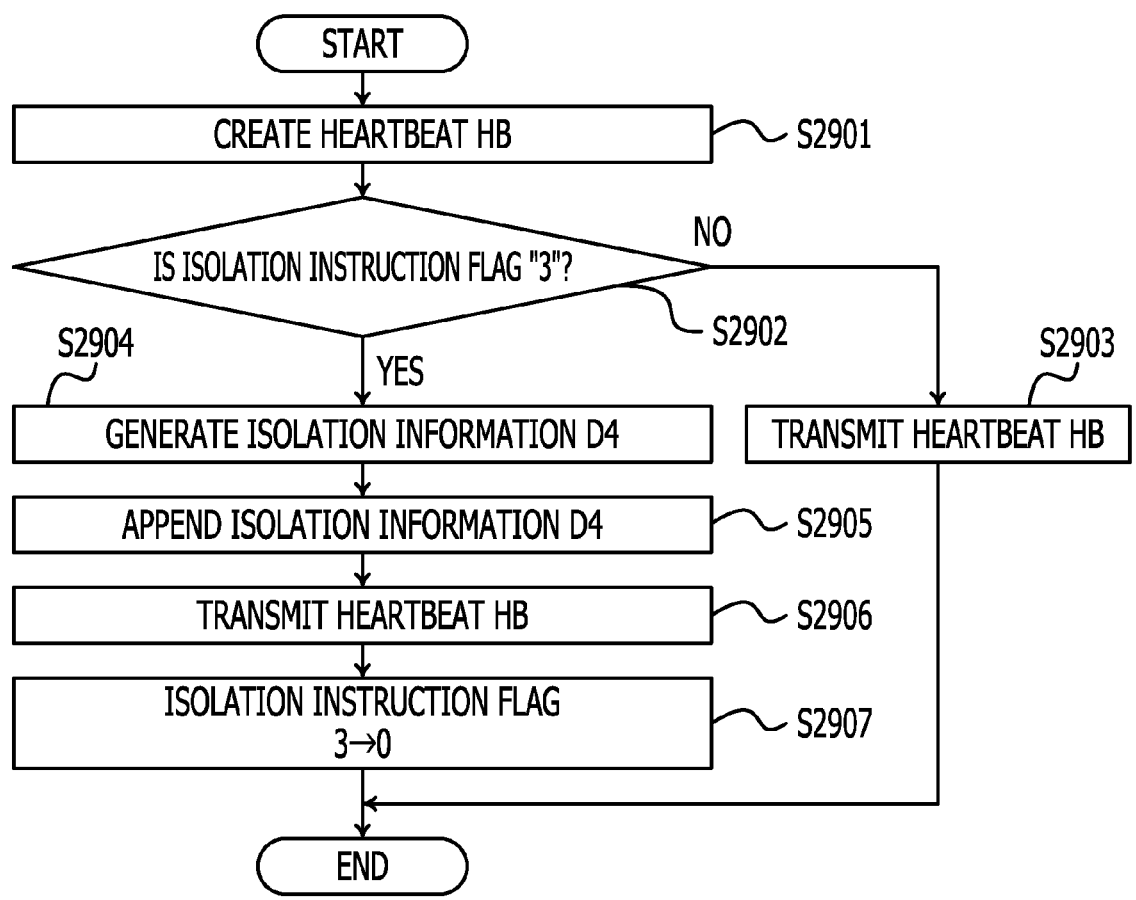
FIG. 29 is a flowchart illustrating an example of a procedure of heartbeat transmission processing performed by the client apparatus.

FIG. 29 is a flowchart illustrating an example of a procedure of heartbeat transmission processing performed by the client apparatus $j. In the flowchart in FIG. 29, first, the client apparatus $j creates a heartbeat HB for the server #i (step S2901). Next, the client apparatus $j decides whether or not the isolation instruction flag is "3" (step S2902).

When the isolation instruction flag is "0" (NO in step S2902), the client apparatus $j transmits the created heartbeat HB to the server #i by using the task LAN (step S2903) and then ends the series of processes in this flowchart.

On the other hand, when the isolation instruction flag is "3" (YES in step S2902), the client apparatus $j generates isolation information D4 in which the number of de-isolation-target servers and the IP address(es) of the de-isolation-target server(s) which were deleted from the isolation-target server list 1000 in step S2805 illustrated in FIG. 28 are set (step S2904).

The client apparatus $j then sets the isolation instruction type "4" in the created heartbeat HB and also appends the isolation information D4 thereto (step S2905). Next, the client apparatus $j transmits the heartbeat HB to the server #i by using the task LAN (step S2906).

The client apparatus $j then changes the isolation instruction flag from "3" to "0" (step S2907) and then ends the series of processes in this flowchart. As a result of the above-described processing, a de-isolation instruction response indicating that the de-isolation-target server de-isolation processing is completed can be issued to the server #i.

Next, a description will be given of an example of handling a case in which the pieces of isolation information (for example, the isolation information D1 and D3) transmitted from the servers #i to the client apparatus $j through heartbeat communication using the task LAN are different from each other.

When a session between the server #i and the client apparatus $j is established through multicast, there is a possibility that responses are returned from all of the servers #1 to #3 including an isolation-target server in response to a session establish request from the client apparatus $j. In this case, when the pieces of isolation information (for example, the isolation information D1) transmitted from the servers #1 to #3 are not the same, it is difficult for the client apparatus $j to decide which of the servers #1 to #3 is a real isolation-target server, making it difficult for the client apparatus $j to block communication with the server in which a fault has occurred.

The present embodiment ensures that matching of the isolation information during session establishment by excluding a state in which the numbers of isolation-target servers match each other and isolation-target servers are different. More specifically, in the present embodiment, combinations of the numbers of isolation-target servers and isolation-target servers recognized by each of the servers #1 to #3 are, for example, those in an association table 3000 illustrated in FIG. 30.

FIG. 30 is a table illustrating combinations of the numbers of isolation-target servers and isolation-target servers. In FIG. 30, the association table 3000 indicates combinations 1 to 12 of the numbers of isolation-target servers and isolation-target servers. The combinations 1 to 12 indicated in the association table 3000 are combinations based on the assumption that it is desired to isolate the servers #1, #2, and #3 in that order.

Each of the combinations 1 to 9 is a combination of the number of isolation-target servers and the isolation-target server(s) when the cluster system 210 has a three-node configuration, that is, is constituted with three servers. Each of the combinations 10 to 12 is a combination of the number of isolation-target servers and the isolation-target server(s) when the cluster system 210 has a two-node configuration, that is, is constituted with two servers.

Since most recent isolation information is also delivered from the client apparatus $j to a server having a fault through heartbeat communication using the task LAN, the situation in which the pieces of isolation information are different from each other between the servers is temporary. However, it is important that all of the combinations 1 to 12 indicated in the association table 3000 be dealt with, since there is a time differences between the heartbeat HB and the session establishment. In FIG. 30 "*" indicates, in the corresponding state, a server that a normal server regards as a server having a fault.

In this case, since the combinations 1 and 10 do not have any isolation-target server, a session is established in a normal manner. When the pieces of isolation information between the servers match each other as in the combinations 3, 9, and 12, no mismatch occurs during session establishment, and thus no problem occurs when the client apparatus $j identifies a server having a fault.

On the other hand, when the pieces of isolation information between the servers do not match each other, the present embodiment makes it possible to ensure that the servers assumes any one of the states in the association table 3000. This allows the client apparatus $j to use isolation information including the largest number of isolation-target servers among the pieces of isolation information received from the servers. Thus, even when a session is established in a state in which the pieces of isolation information do not match each other between the servers, it is possible to inhibit the occurrence of a mismatch in the isolation information.

More specifically, schemes in processing 1, processing 2, and processing 3 are used to ensure that the number of isolation-target servers and the isolation-target servers recognized by each server assume any one of the states in the association table 3000.

In processing 1, after normal servers (working/standby servers) synchronize information about an isolation-target server with each other, each of the normal servers isolates a server having a fault. This makes it possible to equalize the isolation information between the servers.

In processing 2, when one of the normal servers (working/standby servers) succeeds in isolation of a server having a fault, the isolation information (the isolation-target server list 1000) of each normal server is updated.

In processing 3, the client apparatus $j transmits, through heartbeat communication using the task LAN, most recent isolation information to the server having a fault and being able to perform communication using the task LAN.

As described above, upon detecting a fault in the working server #k, the server #i according to the first embodiment can generate isolation information D1 in which the IP address of the working server #k is set as the IP address of an isolation-target server. In addition, according to the server #i, through use of the task LAN, the heartbeat HB1 in which the isolation instruction type "1" is set and to which the isolation information D1 is appended can be transmitted to all of the client apparatuses $1 to $4 that are connected. Thus, through the heartbeat communication using the task LAN, the isolation request for isolating the working server #k in which a fault has occurred can be issued to all of the client apparatuses $1 to $4 that are connected.

According to the client apparatus $j according to the first embodiment, the heartbeat HB1 in which the isolation instruction type "1" is set and to which the isolation information D1 is appended can be received from the server #i through use of the task LAN. Also, according to the client apparatus $j, the IP address(es) of the isolation-target server(s) identified with the isolation information D1 appended to the heartbeat HB1 can be registered in the isolation-target server list 1000.

According to the client apparatus $j, the IP address(es) of the isolation-target server(s) can be identified based on the isolation-target server list 1000, and data whose transmission-source IP address is included in the IP address(es) of the isolation-target server(s) can be discarded. With this arrangement, upon receiving the heartbeat HB1 from the server #i, it is possible to block communication with the working server #k in which a fault has occurred, that is, it is possible to isolate the working server #k.

In addition, according to the client apparatus $j, it possible to generate isolation information D2 in which the IP addresses registered in the isolation-target server list 1000 are set as the IP addresses of isolated servers. Additionally, according to the client apparatus $j, the heartbeat HB2 in which the isolation instruction type "2" is set and to which the isolation information D2 is appended can be transmitted to the server #i through use of the task LAN. Thus, an isolation response for the working server #k in which a fault has occurred can be issued to the server #i through heartbeat communication using the task LAN.

In addition, according to the client apparatus $j, through use of the virtual IP addresses assigned to the servers #1 to #3, the heartbeat HB2 can be transmitted to all of the servers #1 to #3 including the working server #k in which a fault was detected. With this arrangement, the working server #k in which a fault was detected can recognize that the local server #k has a fault, when it can receive the heartbeat HB2. For example, even when the management LAN between a switching-source server (a faulty server) and a switching-target server is interrupted, the isolation information can be transmitted to the switching-source server in the order of the switching-target server, the client apparatus, and the switching-source server.

According to the server #i, upon receiving the heartbeat HB2 from the client apparatus $j, it is possible to decide that the isolation-target server isolation processing is completed in the client apparatus $j. In addition, according to the client apparatus $j, if the server #i does not receive the heartbeat HB2 from the client apparatus $j even when the timeout time T_out has passed after transmitting the heartbeat HB1, it is possible to decide that the isolation-target server isolation processing is omissible in the client apparatus $j.

With this arrangement, when the heartbeats HB2 are received from all of the client apparatuses $1 to $4 or when the timeout time T_out has passed after transmitting the heartbeat HB1 to the client apparatuses $1 to $4, it can be decided the isolation-target server isolation processing is completed. Accordingly, for example, when the heartbeat HB1 is lost over the network 230 or when the client apparatus $j is unable to return an isolation response to an isolation request, it is possible to confirm that the isolation-target server isolation processing is completed.

Additionally, according to the server #i, when a fault in the working server #k is detected, it is possible to transmit a power-supply stop instruction to the power-supply control device #k for controlling the power supply of the working server #k. This allows the power-supply control device #k to stop the power supply of the working server #k.

In addition, according to the server #i, when a power-supply stop response is received from the power-supply control device #k or when the isolation-target server isolation processing in the client apparatuses $1 to $4 is completed, it is possible to switch the working server from the server #k in which a fault was occurred to the local server #i.

With the arrangement described above, according to the information processing system 200 according to the first embodiment, even under a situation in which the working server #k in which a fault has occurred is in a state in which it does not operate properly, such as in a semi-death state, the working server #k in which the fault has occurred can be disconnected from the cluster system 210.

In addition, even under a situation in which a fault has occurred in the power-supply control device #k in the working server #k or in the network leading to the power-supply control device #k, the working server #k in which the fault has occurred can be disconnected from the cluster system 210. More specifically, for example, even under a situation in which a fault has occurred in the power-supply control device #k, it is possible to perform server switching at the time when the isolation-target server isolation processing in the client apparatuses $1 to $4 is completed.

With this arrangement, when a fault occurs in the power-supply control device #k, it is possible to reduce the amount of time taken for the server switching, compared with a case in which a fault in the power-supply control device #k is detected after the timeout time (for example, 60 seconds) of the power-supply control device #k and then the server switching is performed. For example, when the timeout time T_out of the heartbeat communication is assumed to be 5 seconds, the amount of time taken for the server switching can be reduced to 5 seconds or less. When the isolation-target server isolation processing in all of the client apparatuses $1 to $4 is completed properly, for example, the amount of time taken for the server switching can be reduced to 1 second or less.

Also, even when a virtual IP address is used for access from the client apparatus $j to the working server #k, the client apparatus $j can also block communication with the working server #k in which a fault has occurred. In addition, even in a virtual environment or in an environment in which the working server #k does not have the power-supply control device #k, the working server #k in which a fault has occurred can be disconnected from the cluster system 210.

According to the server #i, when a session establish request is received from the client apparatus $j, the heartbeat HB1 can be transmitted to the client apparatus $j that is the request source. Thus, an isolation-target server isolation request can be issued to the client apparatus $j that has started operating properly again from a semi-death state, such as a hang and a newly connected client apparatus.

That is, according to the information processing system 200, even a fault occurs in any of the servers, the client apparatuses, and various apparatuses (for example, power-supply control devices and network equipment), and the networks included in the cluster system 210, it is possible to realize failover.

Second Embodiment

Next, a description will be given of an information processing system 200 according to a second embodiment. A case in which a heartbeat HB does not include the isolation-instruction-type information 402 (see FIG. 4) will be described in the second embodiment. An illustration and a description of portions that are the same as or similar to those described in the first embodiment are not given hereinafter.

First, a description will be given of the electronic-message format of a heartbeat HB according to the second embodiment.

Figure 31:
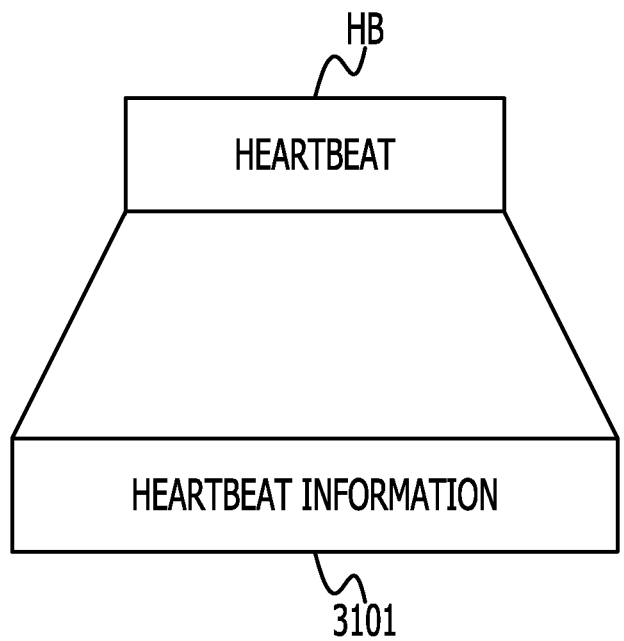
FIG. 31 illustrates an example of the electronic-message format of a heartbeat.

FIG. 31 illustrates an example of the electronic-message format of a heartbeat HB. In FIG. 31, the heartbeat HB includes heartbeat information 3101. The heartbeat information 3101 indicates that the local apparatus is operating properly and includes, for example, information for identifying the computer (the server #i, the client apparatus $j) of the transmission source. Examples of the information include a node number and an IP address.

Next, a description will be given of a specific example of the heartbeat HB.

FIGS. 32A and 32B illustrate specific examples of the heartbeat HB. As illustrated in FIGS. 32A and 32B, the heartbeat HB includes the heartbeat information 3101 and the isolation information D. The isolation information D includes the number of isolation-target servers and the IP address(es) of the isolation-target server(s).

Specifically, the heartbeat HB illustrated in FIG. 32A discloses an example when the number of isolation-target servers is "1". In this case, the number of isolation-target servers, "1", and the IP address of an isolation-target server 1 are set in the isolation information D. The heartbeat HB illustrated in FIG. 32B is an example when the number of isolation-target servers is "2". In this case, the number of isolation-target servers "2" and the IP addresses of the isolation-target servers 1 and 2 are set in the isolation information D.

Next, a description will be given of various procedures of processing in the information processing system 200 according to the second embodiment. First, a description will be given of a procedure of processing for switching the server #i (the working/standby server). Since the procedure of the processing other than the isolation-target server isolation processing is analogous to the procedure of the first switching processing performed by the standby server illustrated in FIG. 16 and the procedure of second switching processing performed by the standby server illustrated in FIG. 19, the description below is given of the procedure of isolation-target server isolation processing in the server #i.

Figure 33:
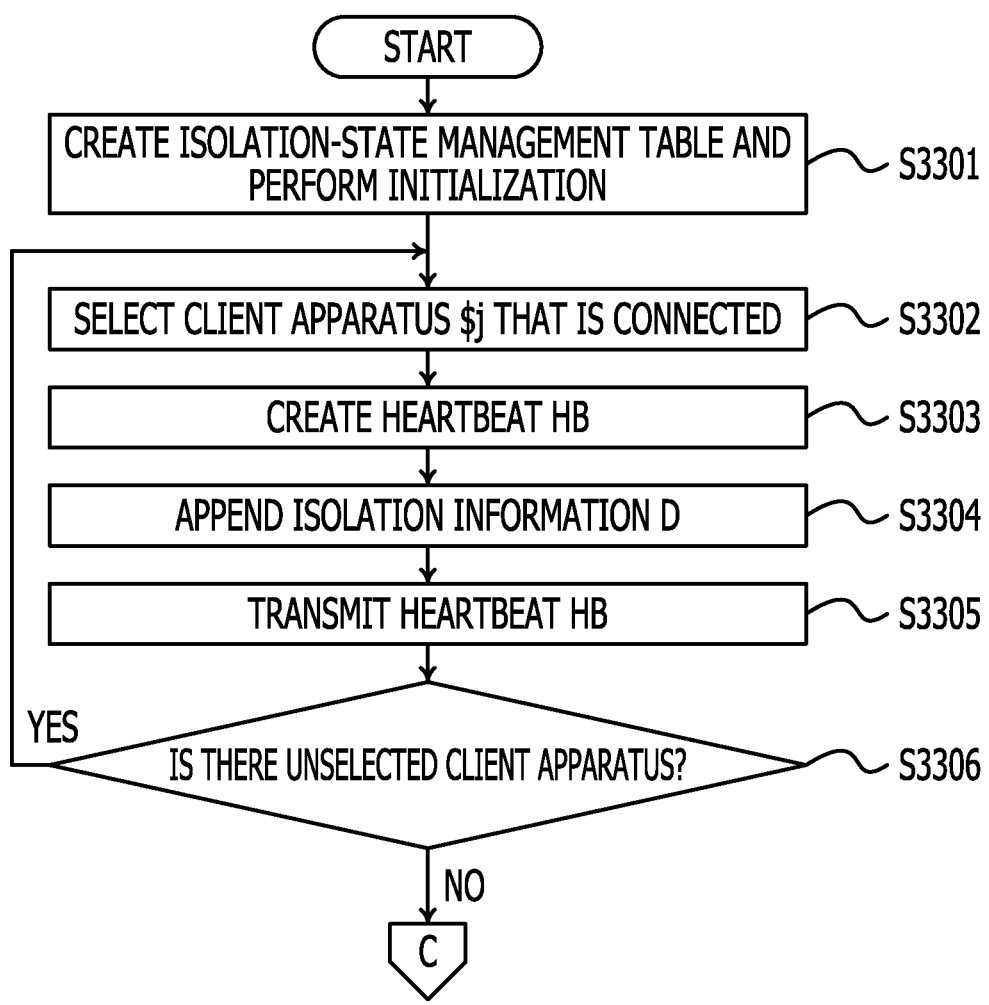
FIG. 33 is a flowchart illustrating an example of a procedure of server isolation processing according to the second embodiment.
Figure 34:
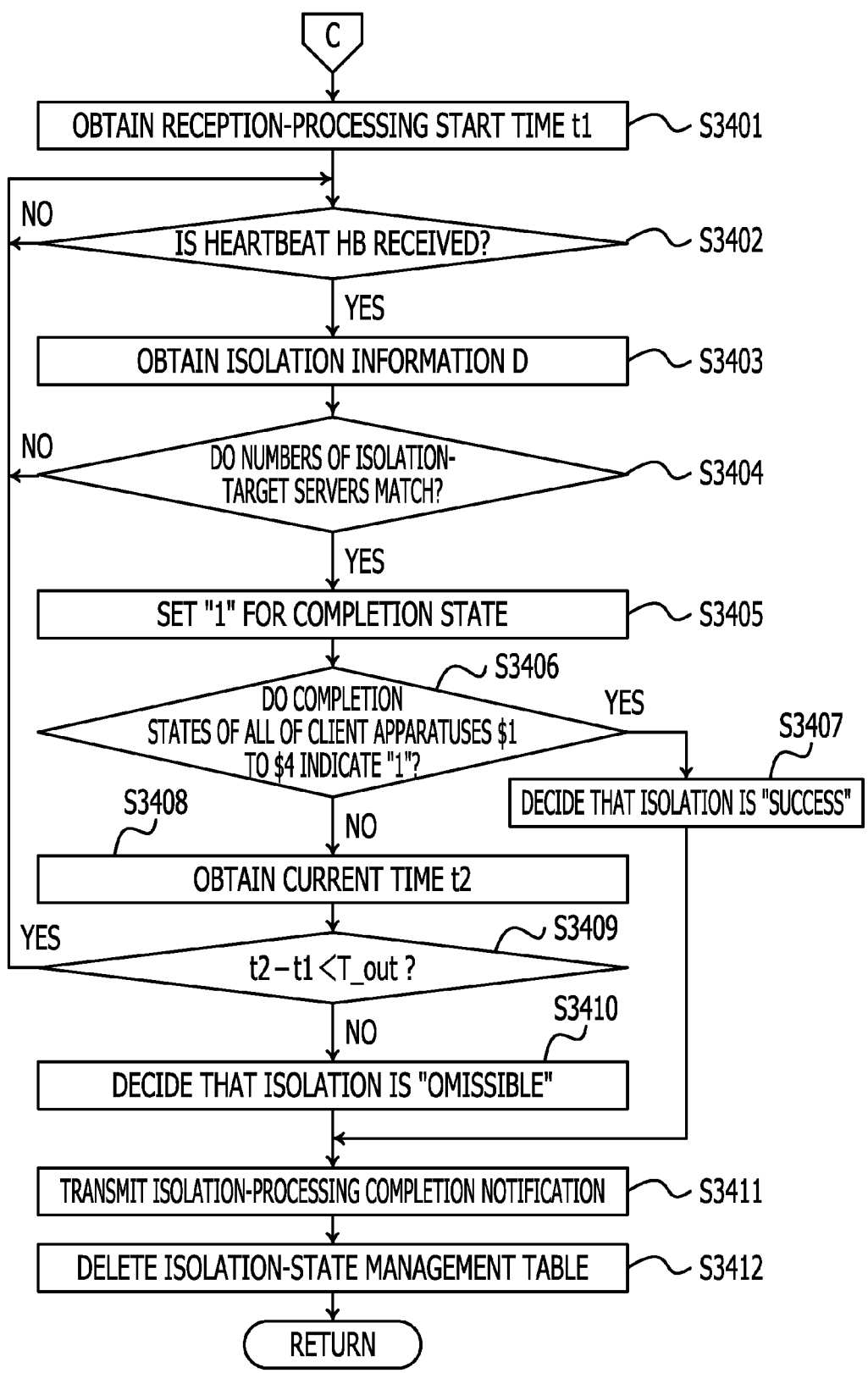
FIG. 34 is a flowchart illustrating an example of the procedure of server isolation processing according to the second embodiment.

FIGS. 33 and 34 are flowcharts illustrating an example of a procedure of server #i isolation processing according to the second embodiment. In the flowchart in FIG. 33, first, the communication control unit #i in the server #i creates an isolation-state management table 900 and performs initialization (step S3301). Next, the communication control unit #i selects one client apparatus $j from the client apparatuses $1 to $4 that are connected (step S3302).

The communication control unit #i then creates a heartbeat HB for the client apparatus $j (step S3303). Next, the communication control unit #i appends the isolation information D to the created heartbeat HB (step S3304). The communication control unit #i then transmits the heartbeat HB to the client apparatus $j by using the task LAN (step S3305).

Next, the communication control unit #i decides whether or not there is a client apparatus that is unselected from the client apparatuses $1 to $4 that are connected (step S3306). When there is an unselected client apparatus (YES in step S3306), the process of the communication control unit #i returns to step S3302.

On the other hand, when there is no unselected client apparatus (NO in step S3306), the process of the communication control unit #i proceeds to step S3401 illustrated in FIG. 34.

In the flowchart in FIG. 34, first, the communication control unit #i obtains the reception-processing start time t1 (step S3401). Next, the communication control unit #i decides whether or not a heartbeat HB is received from the client apparatus $j (step S3402).

In this case, the communication control unit #i waits for reception of a heartbeat HB from each client apparatus $j (NO in step S3402). When a heartbeat HB is received from the client apparatus $j (YES in step S3402), the communication control unit #i obtains the isolation information D from the received heartbeat HB (step S3403).

Next, by referring to the isolation-target server list 1000, the communication control unit #i decides whether or not the number of isolation-target servers recognized by the local server and the number of isolation-target servers identified from the obtained isolation information D match each other (step S3404). When the numbers of isolation-target servers do not match each other (NO in step S3404), the process of the communication control unit #i returns to step S3402.

On the other hand, when the numbers of isolation-target servers match each other (YES in step S3404), the communication control unit #i sets "1" for the completion state of the client apparatus $j in the isolation-state management table 900 (step S3405). By referring to the isolation-state management table 900, the communication control unit #i decides whether or not the completion states of all of the client apparatuses $1 to $4 indicate "1" (step S3406).

When the completion states of all of the client apparatuses $1 to $4 indicate "1" (YES in step S3406), the communication control unit #i decides that the isolation-target server isolation is a "success" (step S3407), and the process proceeds to step S3411.

On the other hand, when the completion states of all of the client apparatuses $1 to $4 do not indicate "1" (NO in step S3406), the communication control unit #i obtains current time t2 (step S3408). The communication control unit #i then decides whether or not the elapsed time from the reception-processing start time t1 to the current time t2 is smaller than the timeout time T_out (step S3409).

When the elapsed time is smaller than the timeout time T_out (YES in step S3409), the process of the communication control unit #i returns to step S3402. On the other hand, when the elapsed time is larger than or equal to the timeout time T_out (NO in step S3409), the communication control unit #i decides that the isolation of the isolation-target server is "omissible" (step S3410).

Next, the communication control unit #i transmits an isolation-processing completion notification to the cluster control unit #i (step S3411). The communication control unit #i then deletes the isolation-state management table 900 (step S3412), and the process returns to the step in which the isolation processing was called.

As a result of the above-described processing, when it is decided that the isolation-target server isolation processing in all of the client apparatuses $1 to $4 that are connected is "completed" or is "omissible", the isolation-target server isolation processing may be completed.

Next, a procedure of heartbeat reception processing performed by the client apparatus $j according to the second embodiment will be described with reference to FIG. 35.

Figure 35:
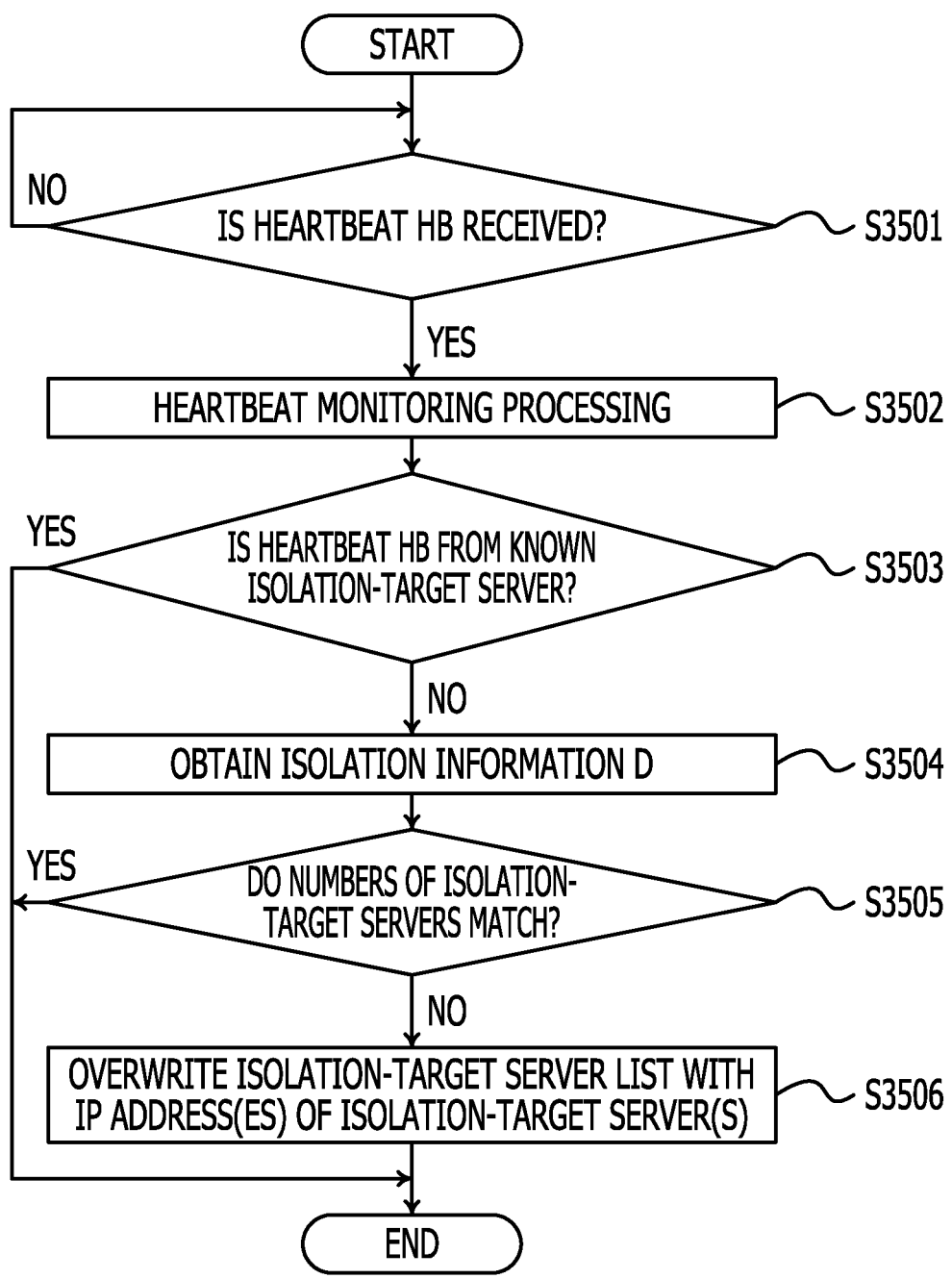
FIG. 35 is a flowchart illustrating an example of a procedure of heartbeat reception processing performed by the client apparatus according to the second embodiment.

FIG. 35 is a flowchart illustrating an example of a procedure of heartbeat reception processing performed by the client apparatus $j according to the second embodiment. In the flowchart in FIG. 35, first, the client apparatus $j decides whether or not a heartbeat HB is received from the server #i (step S3501).

In this example, the client apparatus $j waits for reception of a heartbeat HB from the server #i (NO in step S3501). Upon receiving a heartbeat HB from the server #i (YES in step S3501), the client apparatus $j executes the heartbeat monitoring processing (step S3502).

Next, by referring to the isolation-target server list 1000, the client apparatus $j decides whether or not the received heartbeat HB is a heartbeat HB from a known isolation-target server (step S3503). When the received heartbeat HB is a heartbeat HB from a known isolation-target server (YES in step S3503), the client apparatus $j ends the series of processes in this flowchart.

On the other hand, when the received heartbeat HB is not a heartbeat HB from a known isolation-target server (NO in step S3503), the client apparatus $j obtains the isolation information D from the received heartbeat HB (step S3504).

Next, by referring to the isolation-target server list 1000, the communication control unit $j in the client apparatus $j decides whether or not the number of isolation-target servers recognized by the local client apparatus $j and the number of isolation-target servers identified with the isolation information D match each other (step S3505). When the numbers of isolation-target servers match each other (YES in step S3505), the client apparatus $j ends the series of processes in this flowchart.

On the other hand, when the numbers of isolation-target servers do not match each other (NO in step S3505), the client apparatus $j overwrites the isolation-target server list 1000 with the IP address(es) of the isolation-target server(s) included in the isolation information D (step S3506) and then ends the series of processes in this flowchart.

As a result of the above-described processing, it is possible to isolate the isolation-target server identified with the isolation information D appended to the heartbeat HB from the server #i.

Next, a procedure of heartbeat transmission processing performed by the client apparatus $j according to the second embodiment will be described with reference to FIG. 36.

Figure 36:
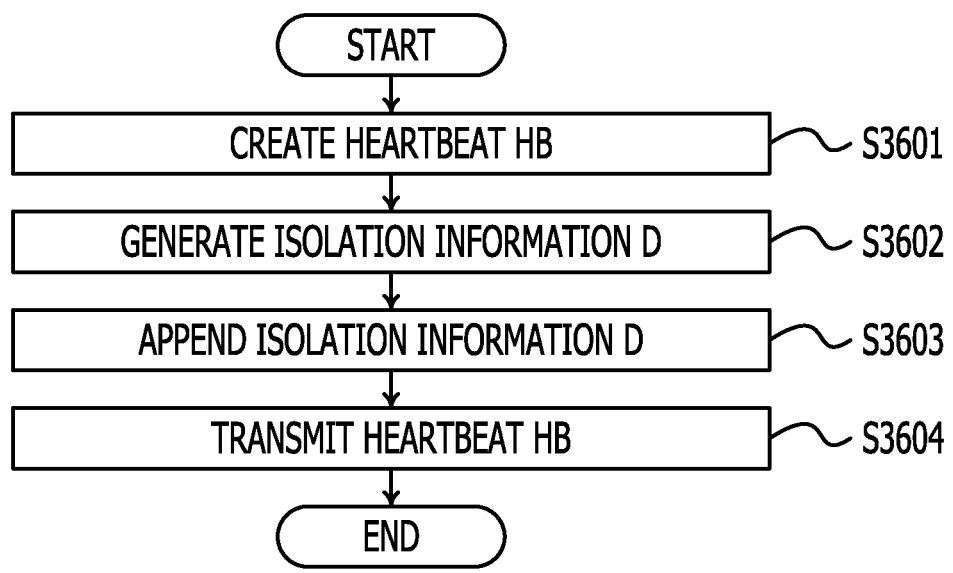
FIG. 36 is a flowchart illustrating an example of a procedure of heartbeat transmission processing performed by the client apparatus according to the second embodiment.

FIG. 36 is a flowchart illustrating an example of a procedure of heartbeat transmission processing performed by the client apparatus $j according to the second embodiment. In the flowchart in FIG. 36, first, the client apparatus $j creates a heartbeat HB for the server #i (step S3601).

The client apparatus $j then generates isolation information D in which the number of isolation-target servers and the IP address(es) of the isolation-target server(s) which are registered in the isolation-target server list 1000 are set (step S3602). Next, the client apparatus $j appends the isolation information D to the created heartbeat HB (step S3603).

The client apparatus $j then transmits the heartbeat HB to the server #i by using the task LAN (step S3604) and then ends the series of processes in this flowchart. As a result of the above-described processing, it is possible to notify the server #i that the isolation-target server isolation processing is completed. Although the isolation-target server isolation processing has been described above, de-isolation-target server de-isolation processing is also performed in a similar manner.

As described above, according to the server #i according to the second embodiment, it is possible to decide whether or not the number of isolation-target servers recognized by the local server #i and the number of isolation-target servers identified with the isolation information D appended to the received heartbeat HB received from the client apparatus $j match each other. Thus, even when the heartbeat HB does not include an isolation instruction type, a decision as to whether or not the isolation-target server isolation processing in the client apparatus $j is completed can be made based on whether or not the numbers of isolation-target servers match each other.

A computer, such as a personal computer or a workstation, may be used to execute a prepared control program to realize the control method described above in the above-described embodiments. The control program is recorded to a computer-readable recording medium, such as a hard disk, a flexible disk, a compact disc read only memory (CD-ROM), a magneto-optical (MO) disk, or a digital versatile disc (DVD), is subsequently read therefrom by the computer, and is executed thereby. The control program may also be distributed over a network, such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing method comprising:
executing a processing corresponding to a first request of a terminal apparatus using a first information processing apparatus;
when a fault occurs in the first information processing apparatus, transmitting an apparatus information that identifies the first information processing apparatus from a second information processing apparatus to the terminal apparatus;
after receiving the apparatus information by the terminal apparatus, discarding data transmitted from the first information processing apparatus to the terminal apparatus;
transmitting, from the terminal apparatus to the second information processing apparatus, a response notification indicating that the apparatus information is received by the terminal apparatus; and after receiving the response notification by the second information processing apparatus, executing the processing corresponding to a second request of the terminal apparatus using the second information processing apparatus.

2. The information processing method according to claim 1,
wherein the first information processing apparatus is an active apparatus, and the second information processing apparatus is a standby apparatus.

3. The information processing method according to claim 1,
wherein the fault in the first information processing apparatus is an interruption of communication between the first information processing apparatus and the second information processing apparatus.

4. The information processing method according to claim 1, wherein
the second information processing apparatus transmits the apparatus information with a first heartbeat to the terminal apparatus, the first heartbeat indicating that the second information processing apparatus is operating, and
the terminal apparatus transmits the response notification with a second heartbeat to the second information processing apparatus, the second heartbeat indicating that the terminal apparatus is operating.

5. The information processing method according to claim 1,
wherein, when the number of terminal apparatuses is two or more, the second information processing apparatus enters a mode in which the processing corresponding to the second request from the terminal apparatus is to be executed, based on reception of the response notifications from all of the terminal apparatuses.

6. The information processing method according to claim 1, wherein,
when a certain amount of time has passed after transmitting the apparatus information, the second information processing apparatus enters a mode in which the processing corresponding to the second request of the terminal apparatus is to be executed.

7. The information processing method according to claim 5,
wherein, based on reception of a communication-channel establish request of the terminal apparatus from which the second information processing apparatus does not receive the response notification, the second information processing apparatus transmits the apparatus information to the terminal apparatus from which the communication-channel establish request is received.

8. The information processing method according to claim 5,
wherein, based on reception of a communication-channel establish request of the terminal apparatus which is newly connected to the second information processing apparatus, the second information processing apparatus transmits the apparatus information to the terminal apparatus from which the communication-channel establish request is received.

9. The information processing method according to claim 1, further comprising:
transmitting a power-supply stop instruction from the second information processing apparatus to a power-supply control device that controls power supply of the first information processing apparatus; and executing the processing corresponding to the second request of the terminal apparatus using the second information processing apparatus, based on a power-supply stop response indicating that the power supply of the first information processing apparatus is stopped, the power-supply stop response being received from the power-supply control device.

10. The information processing method according to claim 1, wherein
transmitting, from the terminal apparatus to the first information processing apparatus, a second heartbeat that indicates the terminal apparatus is operating with the response notification; and
disconnecting communication between the first information processing apparatus and the terminal apparatus, based on the second heartbeat.

11. A computer-readable recording medium storing a program for causing a computer to execute a process, the process comprising:
executing a processing corresponding to a first request of a terminal apparatus using a first information processing apparatus;
when a fault occurs in the first information processing apparatus, transmitting an apparatus information that identifies the first information processing apparatus from a second information processing apparatus to the terminal apparatus;
after receiving the apparatus information by the terminal apparatus, discarding data transmitted from the first information processing apparatus to the terminal apparatus;
transmitting, from the terminal apparatus to the second information processing apparatus, a response notification indicating that the apparatus information is received by the terminal apparatus; and
after receiving the response notification by the second information processing apparatus, executing processing corresponding to a second request of the terminal apparatus using the second information processing apparatus.

12. The computer-readable recording medium according to claim 11,
wherein the first information processing apparatus is an active apparatus, and the second information processing apparatus is a standby apparatus.

13. The computer-readable recording medium according to claim 11,
wherein the fault in the first information processing apparatus is an interruption of communication between the first information processing apparatus and the second information processing apparatus.

14. An information processing system comprising:
a terminal apparatus including a first memory and a first processor coupled to the first memory;
a first information processing apparatus that executes a processing corresponding to a first request from the terminal apparatus; and
a second information processing apparatus including a second memory and a second processor coupled to the second memory,
wherein the second processor is configured to transmit, when a fault occurs in the first information processing apparatus, apparatus information that identifies the first information processing apparatus to the terminal apparatus,
after receiving the apparatus information by the terminal apparatus, the first processor is configured to discard data transmitted from the first information processing apparatus, and to transmit, to the second information processing apparatus, a response notification that indicates the apparatus information is received by the terminal apparatus, and after receiving the response notification by the second information processing apparatus, the second processor is configured to execute a processing corresponding to a second request of the terminal apparatus.

15. The information processing system according to claim 14, wherein the first information processing apparatus is an active apparatus, and the second information processing apparatus is a standby apparatus.

16. The information processing system according to claim 14, wherein the fault in the first information processing apparatus is an interruption of communication between the first information processing apparatus and the second information processing apparatus.

* * * * *